US012599118B2

(12) United States Patent
Chadwick

(10) Patent No.:     US 12,599,118 B2
(45) Date of Patent:     Apr. 14, 2026

(54) SYSTEMS AND METHODS OF ACOUSTIC RELEASE AQUATIC TRAP

(71) Applicant: Sub Sea Sonics, LLC, San Diego, CA (US)

(72) Inventor: David Bartholomew Chadwick, San Diego, CA (US)

(73) Assignee: Sub Sea Sonics, LLC, San Diego, CA (US)

( * ) Notice: Subject to any disclaimer, the term of this patent is extended or adjusted under 35 U.S.C. 154(b) by 0 days.

(21) Appl. No.: 18/213,236

(22) Filed: Jun. 22, 2023

(65) Prior Publication Data

US 2023/0413792 A1     Dec. 28, 2023

Related U.S. Application Data

(60) Provisional application No. 63/354,615, filed on Jun. 22, 2022.

(51) Int. Cl.
*A01K 69/06*     (2006.01)
*G08B 21/18*     (2006.01)

(52) U.S. Cl.
CPC .............. *A01K 69/06* (2013.01); *G08B 21/18* (2013.01)

(58) Field of Classification Search
CPC ........ A01K 69/00; A01K 69/06; A01K 69/08; A01K 69/10; A01K 97/12; A01K 97/125; A01K 79/00; A01K 99/00
USPC ........ 43/100, 102, 103, 105, 17; 441/1, 2, 6, 441/13, 30, 31, 32, 33
See application file for complete search history.

(56) References Cited

U.S. PATENT DOCUMENTS

| | | | | |
|---|---|---|---|---|
| 3,848,226 A | * | 11/1974 | Perez | ........................ B63C 7/26 367/133 |
| 5,022,013 A | * | 6/1991 | Dalton | .................... B63B 22/06 367/4 |
| 6,261,142 B1 | * | 7/2001 | Fiotakis | .................. B63B 22/02 441/2 |
| 6,379,202 B1 | * | 4/2002 | Liu | ........................... B66C 1/62 441/2 |
| 9,126,658 B1 | * | 9/2015 | Ryan | ....................... A01K 71/00 |
| 12,022,815 B1 | * | 7/2024 | Borino | ................... A01K 69/08 |
| 2011/0034094 A1 | * | 2/2011 | Biousse | .................... B63C 7/26 441/2 |
| 2017/0332612 A1 | * | 11/2017 | Partan | .................... A01K 69/08 |
| 2019/0202531 A1 | * | 7/2019 | Wang | ..................... A01K 99/00 |
| 2024/0133214 A1 | * | 4/2024 | Bezanson | ............. A01K 69/08 |

* cited by examiner

*Primary Examiner* — William L Gmoser
(74) *Attorney, Agent, or Firm* — Ahmann Kloke LLP

(57)     ABSTRACT

An example line restraint system comprises a housing, processor, motor, release cam, and a receiver. The release cam comprises a stem portion opposite an arm portion. The arm portion may extend away from the stem portion of the release cam. The stem portion may be rotatably coupled to the motor with the motor being configured to turn the arm portion of the release cam between an open and closed state. When in the closed state, an overhang of the arm portion of the release cam at least partially defining a cavity capable of retaining a release line. When in the open state, the release cam opening the cavity to enable release of the release line. The receiver may be configured to receive an acoustic signal. The processor may be configured to trigger the release cam to turn based on the acoustic signal.

19 Claims, 25 Drawing Sheets

Deployment Method  300

Send Request to Deploy one or more Acoustic Release Line Restraint System ～ 302

↓

Identify Requested Acoustic Release Line Restraint System ～ 304

↓

Acquire GPS position and timestamp ～ 306

↓

Deploy Acoustic Release Line Restraint System ～ 308

↓

Create or Update One or More Restraint System Entry ～ 310

↓

Update Local Database ～ 312

Login User Interface 400

Login Field 402

Password Field 404

Release Type Field 406

User Interface 500

ID Field 502

600

Retrieval Method 700

Sync Method 1000

Send Request to Sync
Local Database    1002

Sends updated "others"
including removals    1004

End plug O-Ring 1132

Threaded Rods for Bulkhead Mount 1122

Planetary Gear 1124

Motor 1126

Encoder 1120

Bulkhead 1134

Batteries 1128

Receiver 1136

Acoustic Release
Deck Unit 1200

Display 1202

Protective Shell
1206

Transducer
204

Increase
(I)

Release
(R)

Accept
(A)

(D)
Decrease (S)
Stop (N)
Next

Control
Toggle
1204

Gear Marking System 1300

Sync Enable Button 1306

Retrieve Enable Button 1304

Deploy Enable Button 1302

Sync

Retrieve

Deploy

NIMEA 200

NIMEA 0183

Power

Line Restraint System 1400

Line Release Device 1100

Release Line 1402

Retention Member 1404

Line Release Device 1100

Device Lock 1410

Release Line 1402

D Ring 1412

Retention Member 1404

Aquatic Trap 1406

Locking Member 1408

Retention Member 1404

SYSTEMS AND METHODS OF ACOUSTIC RELEASE AQUATIC TRAP

CROSS-REFERENCE TO RELATED APPLICATIONS

The present application claims benefit of U.S. Provisional Patent Application No. 63/354,615 filed Jun. 22, 2022 and entitled "Acoustic Release Aquatic Traps," which is incorporated by reference herein.

FIELD OF THE INVENTION(S)

Embodiments of the present invention(s) are related generally to aquatic traps and, more particularly to aquatic traps for fishing to reduce the risk of entanglement risk to sea life.

BACKGROUND

Current fishing technologies are a significant risk to aquatic animals (e.g., large whales) within the U.S. EEZ and globally. Entanglements worldwide have been documented to be a chronic problem in a broad range of previous studies. NOAA's National Report on Large Whale Entanglements (2017) for U.S. coastal waters reported that in 2017, 76 confirmed cases of large whale entanglements were documented along the coasts of the United States, with 70 involving live animals and six associated with dead animals and that the five most frequently entangled large whale species were humpback whales, gray whales, minke whales, blue whales, and North Atlantic right whales. Geographically, more than 50% of all entanglement reports occurred in California (32.9%) and Massachusetts (26.6%) waters.

On the East Coast of the U.S., much of the focus on whale entanglement issues has been on the North Atlantic right whale population due to the combination of its endangered status, the strong overlap between whales and fisheries, and the significant number of mortalities relative to the sustainability of the population. On the West Coast, entanglement is a threat to humpback, grey, and blue whales. All of these species are protected under the Marine Mammal Protection Act, with blue whales listed as endangered. Humpback whales on the West Coast are listed as threatened under the Endangered Species Act.

Entanglement rates on the West Coast alone are significant and have increased to a level comparable to the U.S. Northeast and Mid-Atlantic. The recent NOAA 2017 West Coast Entanglement Summary indicated that 31 whales were entangled off the coasts of Washington, Oregon, and California with gear from U.S. fisheries. Humpback whales were the most common species entangled (16), along with gray whales (12), followed by blue whales (3). Two of the confirmed gray whale entanglements involved whales that were found dead. Entanglements were predominantly off the California coast (31) with gray whale entanglements most common in southern California while humpback entanglements most common off central California.

SUMMARY

An example line restraint system comprises a housing, a processor, a motor, a release cam, and a receiver. The motor may be contained within the housing. The housing may protect the motor from getting wet when the housing is submerged. The release cam may extend from the housing. The release cam may comprise a stem portion and an arm portion opposite the stem portion. The stem portion may be proximate to the housing. The arm portion may be opposite the stem portion and away from the housing. The arm portion may extend away from the stem portion of the release cam. The stem portion may be rotatably coupled to the motor. The motor may be configured to turn the arm portion of the release cam between an open and closed state. When in the closed state, an overhang of the arm portion of the release cam at least partially defining a cavity capable of retaining a release line. When in the open state, the release cam opening the cavity to enable release of the release line. The receiver may be configured to receive an acoustic signal. The processor may be configured to trigger the release cam to turn based on the acoustic signal.

The system may further comprise a release line retainer coupled to the line restraint system, a portion of the release line retainer extending from the housing, and wherein in the closed state, the arm portion of the release cam being directed towards the release line retainer, the release line retainer and the overhang of the arm portion of the release cam at least partially defining the cavity. The line restraint system may be capable of being coupled to an aquatic trap and capable of holding a release line in the cavity when the line restraint system is in the closed stated, thereby enabling a trap line coupled to a buoy to be restrained from rising when the aquatic trap is deployed underwater.

The processor may be configured to trigger the release cam to turn if the acoustic signal is of a particular frequency. In some embodiments, the processor is configured to trigger the release cam to turn if the acoustic signal has one or more particular properties.

The system may further comprise a piezo receiver configured to convert vibrations to a voltage to turn the release cam. In some embodiments, the receiver is a transducer configured to provide an indication signal, the indication signal being directed to outside of the housing. The indication signal may be acoustic. The indication signal includes an identifier that identifies the line restraint system.

The line restraint system may be capable of being coupled to at least one bar within an inside of an aquatic trap, the aquatic trap comprising the at least one bar within its structure.

A example method comprises receiving, by a processor of a line restraint system, an acoustic signal, the line restraint system including a housing, triggering, by the processor, an activation signal based on the acoustic signal, the processor being within the housing, and turning, in response to the activation signal, a release cam of the line restraint system, the release cam extending from the housing, the release cam comprising a stem portion and an arm portion opposite the stem portion, the stem portion being proximate to the housing, the arm portion being opposite the stem portion and away from the housing, the arm portion extending away from the stem portion of the release cam, the stem portion being rotatably coupled to a motor, the turning comprising turning, by the motor, the arm portion of the release cam from a closed state to an open state, when in the closed state, an overhang of the arm portion of the release cam at least partially defining a cavity that is enclosed and capable of retaining a release line, when in the open state, the cavity is no longer enclosed to enable release of the release line, the motor being within the housing, the housing sealing the processor and the motor from getting wet when the housing is submerged.

Triggering, by the processor, the activation signal based on the acoustic signal may comprise triggering the activation signal if the acoustic signal is of a particular frequency. Triggering, by the processor, the activation signal based on the acoustic signal may comprise triggering the activation signal if the acoustic signal has one or more particular properties.

Turning, in response to the activation signal, the release cam, may comprise converting vibrations by at least one piezo receiver to a voltage for turning the release cam.

The method may further comprise providing, by a transducer, an indication signal, the indication signal being directed to outside of the housing. The indication signal may be provided upon receiving the acoustic signal.

In some embodiments, the line restraint system is capable of being coupled to at least one bar within an inside of an aquatic trap, the aquatic trap comprising the at least one bar within its structure.

DETAILED DESCRIPTION

Various embodiments described herein are directed to a device to reduce recreational and commercial fishing gear entanglements. The inherent challenge in the development of a viable rope-less fishing system is to reduce or minimize entanglement risk to marine animals such as whales without significantly impacting the viability of the fishery.

Most of the current research toward rope-less fishing technology has focused on adapting devices that were originally developed for retrieval of oceanographic instrumentation, which is generally very expensive, and the retrieval frequency is very low. As a result, retrieval equipment for such instrumentation is relatively expensive, complex, and cumbersome. The exact opposite is the case for some embodiments described herein. In various embodiments, costs for the equipment are reasonable, retrieval frequency is high, and complexity of implementation is reasonably low (complexity that slows down the fishing operation is very detrimental to the economics of fishing).

Some embodiments described herein reduce or eliminate exposure of whales (or other aquatic life) to entanglement hazards in the water column. Some embodiments may be simple enough to be easily integrated into the existing fishing process without undue impact on the time and effort required to deploy and retrieve the fishing gear. In some embodiments, the apparatus may be easily stowed within the footprint of the existing trap and does not impede the stacking of traps. Further, some embodiments provide comparable visibility on the surface to the traditional system. The system may integrate a means to determine the location and identification of the gear by fishermen and enforcement agencies in the absence of surface buoys.

Figure 1A:
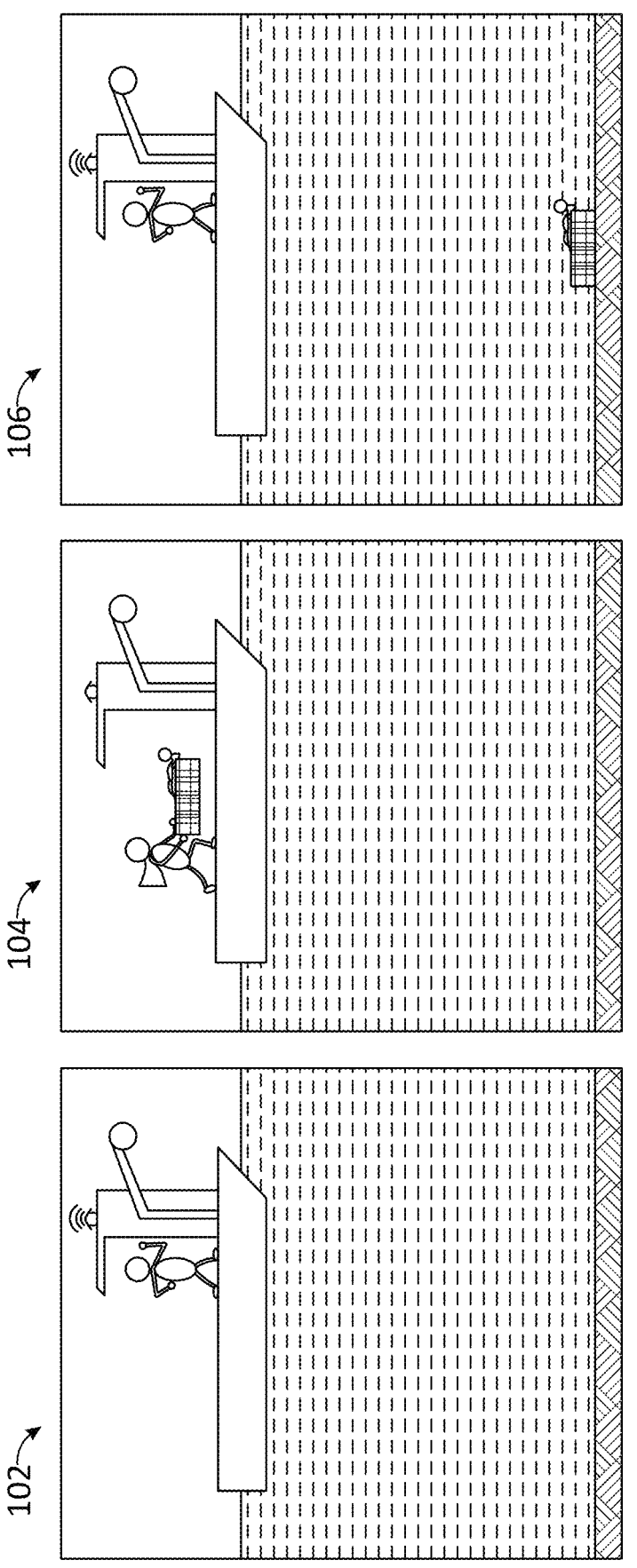
FIG. 1A depicts deployment of an aquatic trap with its trap line and buoy restrained by a line restraining system in some embodiments.
Figure 1B:
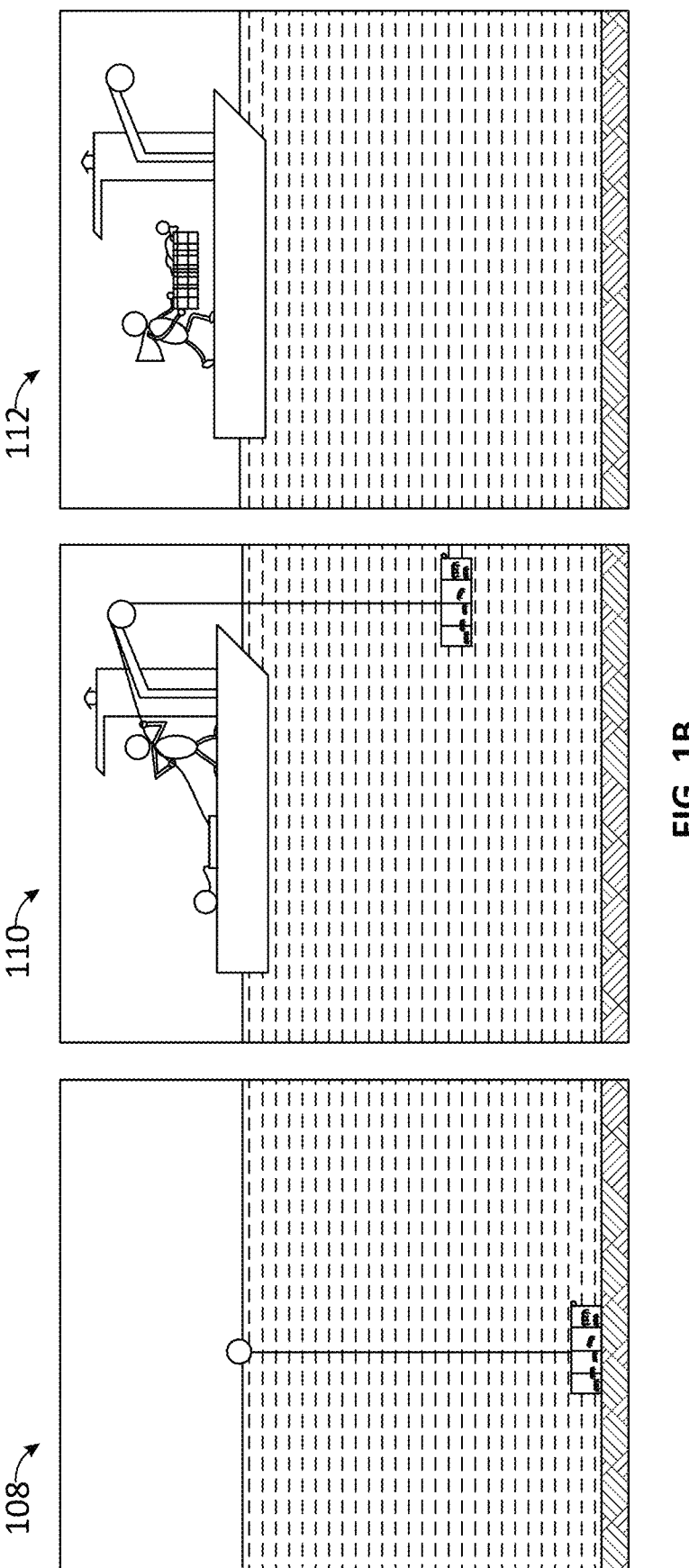
FIG. 1B depicts retrieval of an aquatic trap with its trap line and buoy released by a line restraining system in some embodiments.

FIGS. 1A and 1B depicts the deployment of the rope-less fishery trap (i.e., an aquatic trap) according to some embodiments. In various embodiments, the system and process of use are simple enough to be integrated into the existing fishing process without undue impact on the time and effort required to deploy and retrieve the fishing gear. Some systems described herein are reliable and redundant to the degree that the amount of equipment loss is either the same or less relative to rope-based systems of the prior art.

An aquatic trap is a trap that is used to capture fish, lobsters, crabs, or the like, usually for commercial fishing. It will be appreciated that various embodiments described herein may be utilized with many different types of traps.

FIG. 1A depicts the deployment of an aquatic trap with its trap line and buoy restrained by a line restraining system in some embodiments. The line restraining system may include a line restraint device as discussed herein. A line restraint device may be coupled to each aquatic trap. The line restraint device may restrain the trap line and buoy from extending through the water column. At a preprogrammed time, the line restraint device may trigger a release of the trap line (e.g., rope) and buoy from the aquatic trap, thereby allowing the buoy (and trailing trap line) to rise through the water column and emerge at the surface of the water. The user (e.g., fisherman) may then retrieve the aquatic trap in a traditional manner.

In step 102, the user sets the line restraint system and line restraint device. The line restraint system may restrain all or part of the trap line to the aquatic trap. The aquatic trap is coupled to the trap line. The other end of the trap line is coupled to at least one float or buoy.

The trap line may be coiled. The coiled trap line may be restrained to the outside of the aquatic trap. In one example, the coiled trap line may be prevented from uncoiling underwater by a release line that is coupled to the line restraint device.

The line restraint system may include one or more restraining members (e.g., one or more bars or elongated members) connected by one end to the aquatic trap and connected by the other end to the release line. The release line may also be coupled to the line restraint device to prevent the coiled trap line from uncoiling and allowing the buoy from floating to the surface.

In step 104, the user may configure the line restraint device to open or otherwise disengage with one end of the release line at a particular event (e.g., at a programmed time and/or when the line restraint device receives an acoustic signal). The programmed time may be when the line restraint device is programmed to trigger release of the trap line and buoy. In various embodiments, the line restraint device includes a timer that may be set to trigger release of the trap line and buoy. The line restraint device may include a timer-release that is preprogrammed so that the buoy may pop up out of the water just before the next visit, thus minimizing exposure and risk for entanglement of nearby whales.

In some embodiments, the line restraint system includes a receiver and a sensor. The receiver may receive an acoustic signal. The acoustic signal may be unique to a particular line restraint system. When an acoustic sensor of the line restraint device recognizes the acoustic signal, the line restraint device may release the release line to allow the trap line and buoy to rise.

After the trap line is coiled, the coiled trap line is held at the aquatic trap (at least in part) by the release line. The line restraint device is subsequently set, and the user may deploy the aquatic trap (e.g., the user may drop off the aquatic trap into the water) in step 106. The aquatic trap will sink, taking the restrained coiled trap line and the buoy.

In various embodiments, the trap line may be coiled to the aquatic trap and held in place by the line restraint system (e.g., including one or more restraining members or a release line). The line restraint device may include a hook or lever configured to secure the line restraint system by hooking onto the release line to hold\ the line restraint system in place. At the appropriate time (e.g., upon a preprogrammed time or upon receiving a particular acoustic signal), the line restraint device may pivot the hook or lever to release the release line (e.g., loosening or opening the line restraint system), thereby allowing the buoy to float to the surface and uncoil all or part of the trap line on top of the aquatic trap. The line restraint device and the line restraint system are further discussed herein.

The user may deploy any number of aquatic traps. Each aquatic trap may include a restrained coiled trap line held in place, at least in party, by the line restraint device. Each line restraint device may be programmed (e.g., by timer or by receiving an acoustic signal) to release the line of different aquatic traps simultaneously, near simultaneously, or one at a time. In some embodiments, multiple aquatic traps are connected (e.g., in a "trawl line"). In these embodiments, a single line restraint system may be used to retrieve any number of the line of aquatic traps.

FIG. 1B depicts retrieval of an aquatic trap with its trap line and buoy that was previously released by a line restraining system in some embodiments. In step 108, at a particular event (e.g., programmed time or receiving an acoustic signal), the line restraint device may disengage the release line, enabling the buoy to float to the surface and pull the trap line. In another example, the release line may restrain the coiled trap line by wrapping one or more parts of the coiled trap line to the outside of the trap. When the line restraint device disengages with one end of the release line, the buoy floats towards the surface of the water and pulls the trap line. The release line may fully or partially unfurl or unravel to enable all or part of the trap line to uncoil and allow one end of the trap line to be pulled up to the surface of the water by the buoy (the other end of the trap line being coupled to the aquatic trap to enable retrieval by a fisherman).

In step 110, the user (e.g., fisherman) may retrieve the aquatic trap using traditional techniques. For example, the trap line of the aquatic trap may be caught by the user and connected to a winch that can pull the rope and guide the aquatic trap to the boat. Fish in the trap may be stored, let go, or the like. In some embodiments, the winch may include an automated line coiler that coils the trap line as the aquatic trap is hauled into the boat. After being hauled in, the aquatic trap may be redeployed (e.g., after the trap line is coiled and restrained to the aquatic trap by the line restraint device).

In step 112, the aquatic trap may be redeployed. In one example, the trap line may be coiled after retrieval (or is coiled during retrieval). The coiled trap line may be coupled to the aquatic trap with the release line. One end of the release line may be coupled to the line restraint device and the line restraint device configured to hold the line restraint device (e.g., to the aquatic trap) to restrain the coiled trap line and buoy. The user may then drop the aquatic trap back into the water.

Alternatively, the user may coil the trap line and place the line within the aquatic trap. The aquatic traps may be stacked or positioned for storage. In some embodiments, the line restraint device may be connected to a part of the aquatic trap from within the aquatic trap itself, thereby enabling easy storage for the aquatic trap (e.g., the line restraint device may not interfere with the stacking or storage of aquatic traps).

There may be additional steps. For example, the user may optionally scan the trap. In various embodiments, the line restraint device includes a bar code, active identifier, or passive identifier that may be scanned to help identify the aquatic trap and/or the related line restraint device. The user may track which traps and/or line restraint devices are deployed, when they are deployed, and/or where they are deployed. In various embodiments, the line restraint device may include a sensor, tag, acoustic transceiver, and/or the like that enables the device to report a unique identifier and/or location to the user and/or a geolocation system.

The line restraint device and/or the user may provide a position of the trap and/or coupled line restraint device to a geolocation system using a satellite or cell link. In various embodiments, the line restraint device may include an acoustic transceiver configured to provide location information or enable the line restraint device to be located (e.g., through triangulation, strength of signal, and/or other methods). The user (e.g., fisherman) may utilize equipment aboard the ship or boat to receive signals from the line restraint device and then then user may update the location and/or identifier to the geolocation system using the satellite or cell link. In some embodiments, the line restraint device may communicate directly with the geolocation system to report its identification and/or location. The user and/or appropriate authorities may utilize information within the geolocation system to locate, log, and/or track any number of aquatic traps.

In some embodiments, the rope-less trap may include an acoustic tag capable of providing a rope-less trap identifier (for identification) and/or location information. For example, the acoustic tag may be or include a transceiver (e.g., within the line restraint device) that provides a signal (e.g., low frequency) that can be received by a user or enforcement agency on a boat. Each rope-less trap may include a different acoustic tag capable of providing a different identifier so each rope-less trap can be identified, even if the buoy is not deployed.

Figure 2:
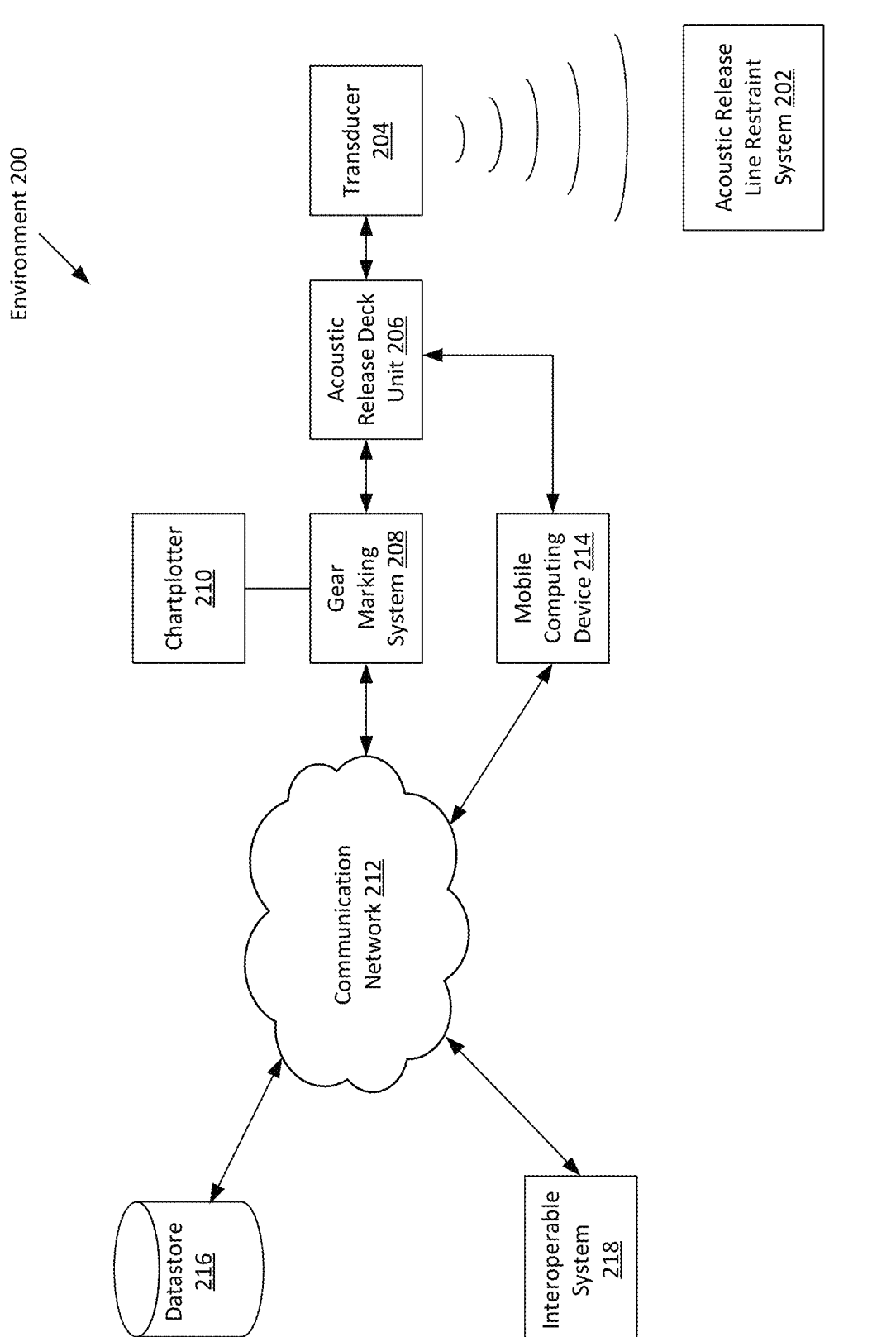
FIG. 2 depicts a block diagram of an example environment capable of deploying and retrieving aquatic traps according to some embodiments.

FIG. 2 depicts a block diagram of an example environment 200 capable of triggering and/or tracking acoustic release line restraint systems according to some embodiments. The environment 200 includes an acoustic release line restraint system 202, a transducer 204, an acoustic release deck unit 206, a gear marking system 208, a chartplotter 210, a communication network 212, a mobile computing device 214, a datastore 216 and an interoperable system 218.

The acoustic release line restraint system 202 includes a line restraint device coupled to an aquatic trap (e.g., via a retention member). The line restraint device of the acoustic release line restraint system 202 may be released based on an audio signal from the transducer 204. When the acoustic release line restraint system 202 is deployed, attributes or properties of the deployment of the acoustic release line restraint system 202 (e.g., as a time when the acoustic release line restraint system 202 was deployed and/or an approximate GPS location of the acoustic release line restraint system 202 when dropped) may be recorded by the gear marking system 208 and/or mobile computing device 214.

The line restraint device of the acoustic release line restraint system 202 may be activated based on a signal, such as an audio or acoustic signal received from the transducer 204. When the acoustic release line restraint system 202 receives a predetermined acoustic signal, a cam release of the line restraint device may turn to an open position or state. This in turn, creates an opening (e.g., of a cavity) of the line restraint device and allows the release line to escape. The release line may be coupled to a float which may then float to the surface. In some embodiments, the line restraint device of the acoustic release line restraint system 202 may have a battery (e.g., of approximately six months) and may have an operating depth of any number of feet (e.g., up to 500 feet). More details of the line restraint device will be discussed with regard to FIG. 11A.

Transducers convert energy from one form to another. In this case, the transducer 204 converts an electronic signal from the acoustic release deck unit 206 to an audio or acoustic signal. The acoustic signal is sent to the acoustic release line restraint system 202. When the acoustic release line restraint system 202 receives the acoustic signal, the acoustic release line restraint system 202 releases the line and the float will rise to the surface of the water.

In some embodiments, a lower-cost alternative may be to make the transducer optional and place an electronic device, such as a piezo buzzer, on each of the acoustic release line restraint system 202. The piezo buzzer may be used as an acoustic receiver. For example, when the piezo buzzer, or piezo receiver, receives and collects vibrations, the piezo buzzer may convert the vibration into a voltage to turn the release cam.

In one example, the acoustic release deck unit 206 (e.g., onboard a boat or ship) may be activated by the gear marking system 208 or a software application installed on the mobile computing device 214 to select, deploy, and/or retrieve one or more line restraint device(s), each of which are coupled to an aquatic trap. The acoustic release deck unit 206 may include an electronics box encased in a protective shell. In some embodiments, the gear marking system 208 includes a display screen and toggle buttons to allow a user to selectively deploy, track, or activate (e.g., trigger an acoustic signal to release a line and float) one or more acoustic release line restraint systems 202.

In various embodiments, the acoustic release deck unit 206 sends a request to the transducer 204. The request may include, for example, an identification code (e.g., a four-digit acoustic identification code). In some embodiments, each identification code may be unique to each line restraint device. One acoustic identification code may be used to identify any number of line restraint devices.

In some embodiments, the signal received by the gear marking system 208 or mobile computing device 214 includes properties such as a particular frequency, amplitude, and/or duration of the sound or tone that may be generated by the transducer 204. These properties may dictate how far the audio or acoustic signal generated by the transducer 204 will travel. More details regarding the acoustic release deck unit 206 will be discussed in FIG. 12.

In some embodiments, the gear marking system 208 has the capability of marking acoustic aquatic traps using existing chartplotters. The gear marking system 208 may include a button box to record GPS locations or positions of aquatic traps using the chartplotter. The gear marking system 208 may allow a fisherman to mark or record the location of an aquatic trap being deployed without marking a location separately on the chartplotter.

As one or more of the acoustic release line restraint systems 202 are deployed or retrieved, the gear marking system 208 may update or create a restraint system entry associated with each acoustic release line restraint system 202. In one example, the restraint system entry may include a status of the associated acoustic release line restraint system. The status may identify the associated acoustic release line restraint system as deployed or retrieved, GPS coordinates, estimated depth, type of aquatic trap, and/or timestamp representing a time when the acoustic release line restraint system was deployed and/or retrieved.

In some embodiments, the gear marking system 208 may include a local datastore which allows the gear marking system 208 to locally store one or more restraint system entries. Wireless Fidelity (Wi-Fi) or internet connectivity provided by a mobile network provider may be less than reliable in the open seas away from the coast.

Satellite internet connectivity may also not be cost effective, may have high latency, and/or slower data upload/ download speeds. As such, in some embodiments, restraint system entries may be stored locally until a time when the fisherman is closer to the coast and more reliable sources of wireless communication, at which time, restraint system entries which were updated and/or created during a particular fishing trip may be uploaded to the datastore 216 and/or interoperable system 218.

In addition to minimizing the intervention required by the fisherman or the user operating the gear marking system

208, the gear marking system 208 may also communicate with one or more of the datastore 216 or interoperable system 218 to update or create a restraint system entry as each acoustic release line restraint system 202 is deployed or retrieved.

The chartplotter 210 is a device that is used in marine navigation that integrates global positioning system (GPS) with an electronic navigational chart (ENC) and allows users to show the current location of the chartplotter 210 on an electronic map.

In some embodiments, the communication network 212 represents one or more computer networks (e.g., LANs, WANs, and/or the like). The communication network 212 may provide communication between or among the environment 200 such as, the mobile computing device 214, the interoperable system 218, the datastore 216, and the gear marking system 208. In some implementations, the communication network 212 comprises computer devices, routers, cables, users, and/or other network topologies. In some embodiments, the communication network 212 may be wired and/or wireless. In various embodiments, the communication network 212 may comprise the Internet, one or more networks that may be public, private, IP-based, non-IP based, and so forth.

A software application installed in the mobile computing device 214 may provide, to a user of the mobile computing device 214, a user interface for deploying and retrieving acoustic release line restraint systems. An example of the user interface can be seen in FIG. 4. The mobile computing device 214 may include a smartphone, tablet, smartwatch, laptop, or some other mobile computing device. In some embodiments, the mobile computing device 214 includes a local datastore to store restrain system entries associated with acoustic release line restraint system 202 deployed by the software application. Modes of wireless communication such as Wi-Fi and internet connectivity provided by mobile network provider may be less than reliable in the open seas away from the coast, so a local datastore may be advantageous.

The datastore 216 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). The datastore 216 may store a restraint system entry associated with each acoustic release line restraint system 202. The restraint system entry may include a status or the acoustic release line restraint system 202 such as deployed underwater or retrieved, global positioning system (GPS) coordinates of a deployed acoustic release line restraint system 202, and estimated depth, type of aquatic trap included in the acoustic release line restraint system 202.

The interoperable system 218 may include a database or datastore which provides a centralized location for different users using line restraint systems manufactured by different companies to determine the location of line restraint systems deployed by different users. The interoperable system 218 may be under the operation of The Ropeless Manufacturer's Workgroup (RMW), which is a cooperative effort between nine companies in the "on-demand" fishing gear industry. The interoperable system 218 has access to attributes or properties associated with different line restraint systems manufactured by different companies. An example of a user interface of the interoperable system 218 may be seen in FIG. 18.

Figure 3:
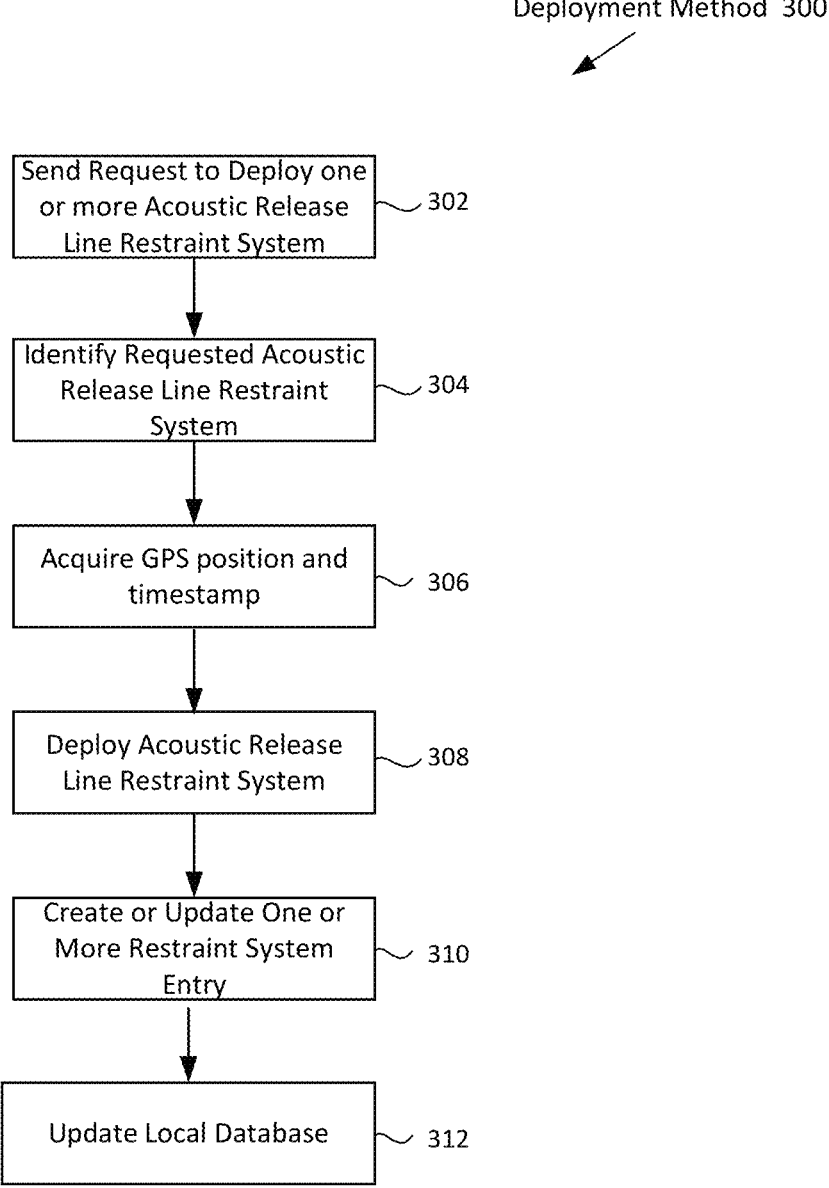
FIG. 3 depicts a flow chart of a method of deploying aquatic traps according to some embodiments.

FIG. 3 depicts a flow chart of a deployment method 300 according to some embodiments. In step 302, the acoustic release deck unit 206 may receive a request to deploy a particular acoustic release line restraint system 202. As seen in FIG. 2, the acoustic release deck unit 206 may receive the request from the gear marking system 208 or the mobile computing device 214.

In some embodiments, the acoustic release deck unit 206 receives the request to deploy one or more acoustic release line restraint systems 202 from the software application installed on the mobile computing device 214. In one example, the user may interact with an example user interface of the software application installed thereon.

Figure 4:
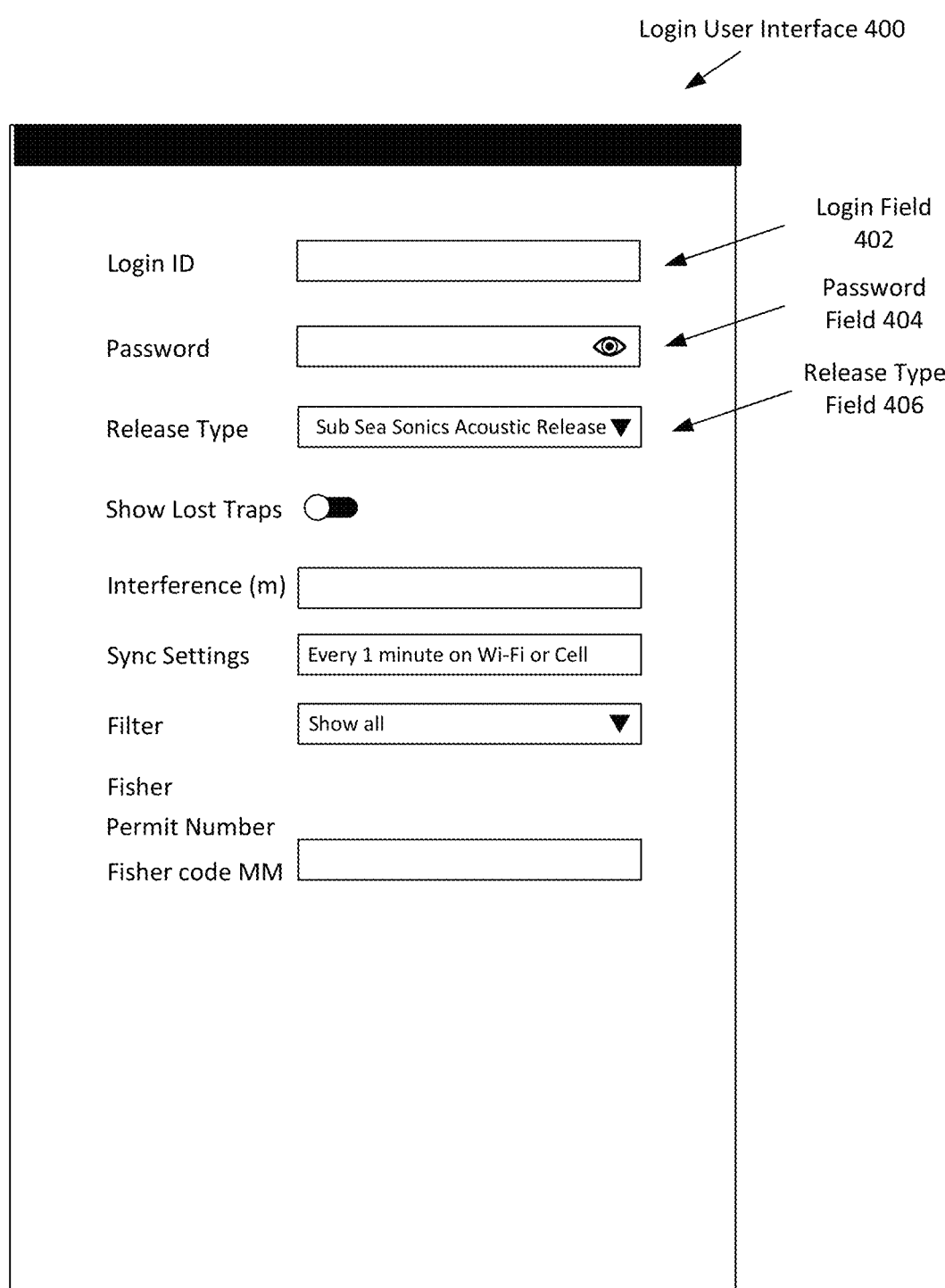
FIG. 4 depicts an example user interface according to some embodiments.

FIG. 4 depicts an example login user interface 400. The user may interact with a login field 402 and a password field 404 to input a login identification (I.D.) and/or password associated with each user. In some embodiments, instead of or in addition to passwords, the software application may utilize biometric identification such as fingerprint, facial or voice recognition, and the like. The user may interact with a release type field 406 to choose a particular type of acoustic release line restraint system.

Figure 5:
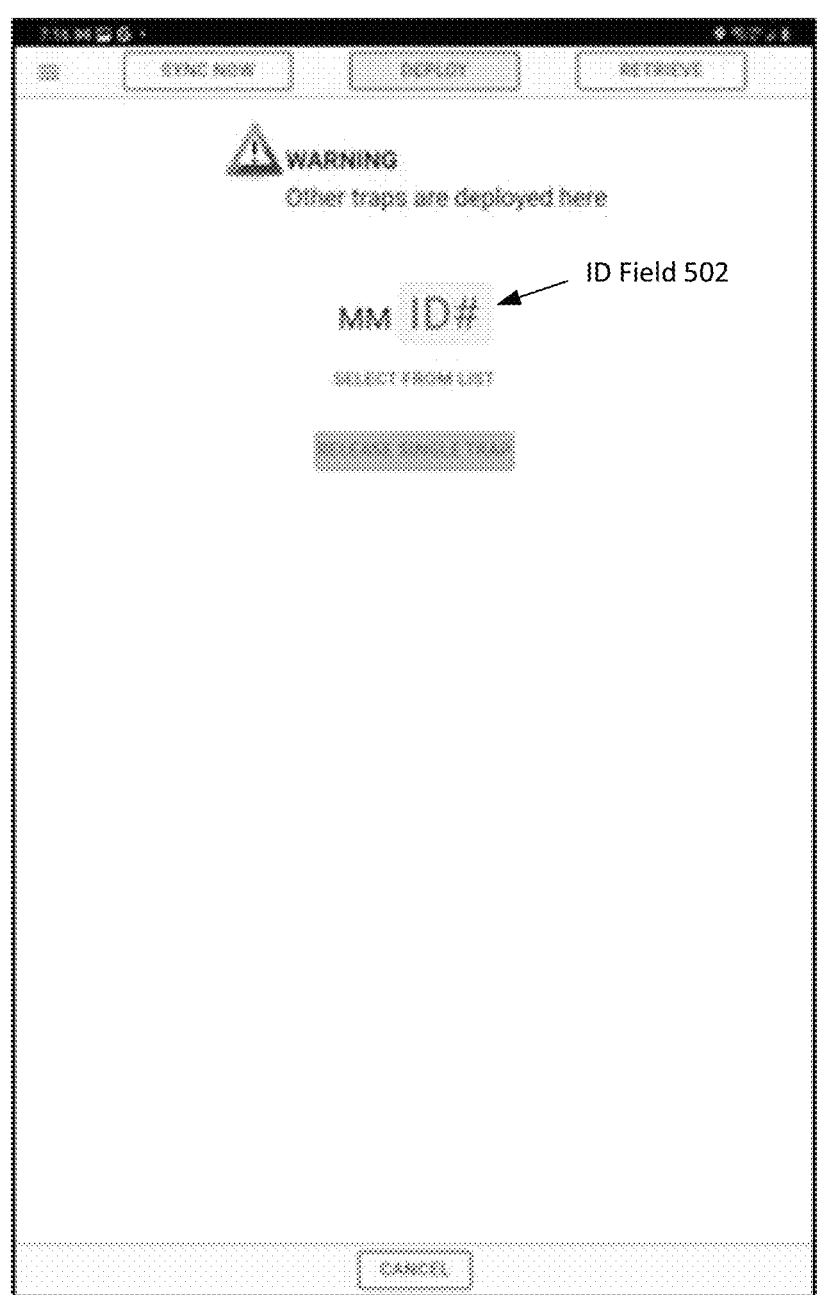
FIG. 5 depicts an example user interface to deploy a particular acoustic aquatic trap according to some embodiments.

The request to deploy an acoustic release line restraint system 202 may identify a particular acoustic release line restraint system. In one example, the user may interact with an ID field 502 of a user interface 500 of FIG. 5 to identify a particular acoustic release line restraint system 202. In some embodiments, the acoustic release line restraint system 202 may be identified by a number, a letter, or some combination thereof.

In step 304, the software application may provide to a graphics display a list of restraint system entries associated with one or more acoustic release line restraint systems deployed or retrieved by the user and/or other users in a similar geographical area. In some embodiments, the list of acoustic release line restraint systems may be provided to a display 1202 of an acoustic release deck unit 1200 of FIG. 12.

The user may interact with one or more control toggles 1204 to navigate the list of acoustic release line restraint systems. Each of the acoustic release line restraint systems 202 may be associated with particular properties of attributes such as the frequency, amplitude, and duration of tone or sound. These properties of attributes may be used to trigger the acoustic release line restraint system to release the line and float of an aquatic trap. Other information or properties associated with each acoustic release line restraint system 202 may include a type of aquatic trap, how many times the particular acoustic release line restraint system has been deployed/retrieved, remaining/expected battery life at the acoustic release line restraint system 202, and/or the like.

In optional step 306, the mobile computing device 214 may provide a current GPS location/position and timestamp to the software application.

In step 308, the software application may send a request to the acoustic release deck unit 206 to deploy or release one or more acoustic release line restraint systems 202. The request may include properties such as a particular frequency of the sound or tone to be generated by the transducer 204, as well as amplitude and duration. These properties may dictate how far the audio or acoustic signal generated by the transducer 204 will travel and help to control which acoustic aquatic trap is triggered to float to the water's surface.

In some embodiments, a single tone or acoustic signal generated by the acoustic release deck unit 206 may trigger multiple acoustic release line restraint system 202 to float or rise to the surface. In various embodiments, the strength or amplitude of the acoustic signal determines the number of acoustic release line restraint system 202 that are triggered, such that an acoustic signal of a higher amplitude may trigger more acoustic release line restraint system 202 to float or rise to the surface of the water compared to another acoustic signal of a lower amplitude. In one example, a user may selectively trigger certain acoustic release line restraint systems and not others in a particular geographical area.

Figure 6:
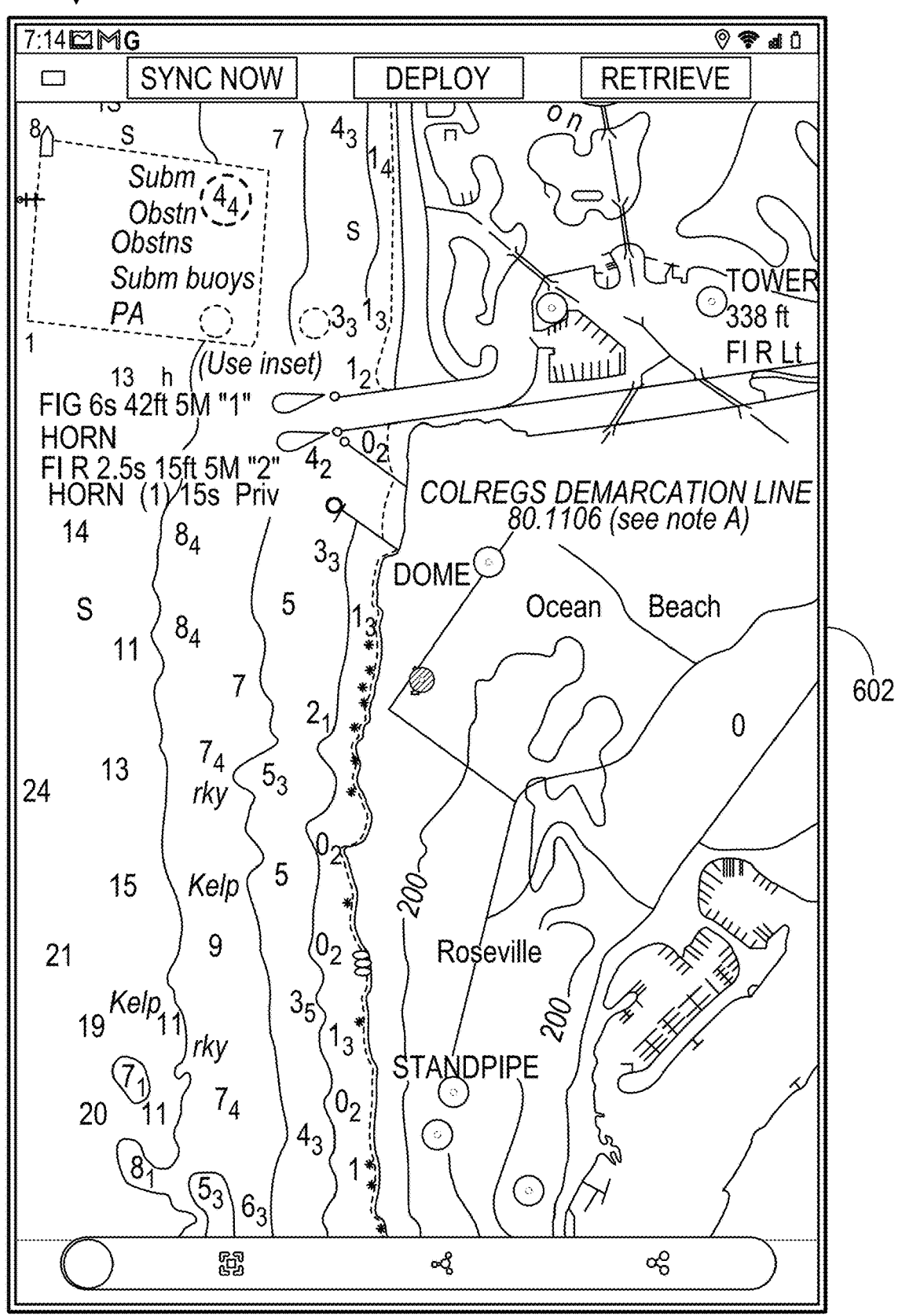
FIG. 6 depicts an example user interface showing an area of a map according to some embodiments.

In step 310, the software application may create or update multiple restraint system entries, each associated with each acoustic release line restraint system 202 deployed by the acoustic release deck unit 206. In one example, after the acoustic release deck unit 206 deploys the acoustic release line restraint system 202, the acoustic release deck unit 206 may send an acknowledgment signal to the mobile computing device 214. Once the software application receives the acknowledgment signal, the mobile computing device 214 may provide (e.g., to the mobile computing device 214) a geographical map of the area and one or more icons depicting an approximate location of the deployed acoustic release line restraint system. FIG. 6 depicts a user interface 600 that includes a map 602. Map 602 depicts the geographical area along with nautical information associated with the area, such as the water depth, nautical and terrestrial features such as standpipes and domes, and the like.

In step 312, the software application may store one or more restraint system entries in a local datastore. As discussed herein, Wi-Fi or internet connectivity provided by a mobile network provider may be unreliable in the open seas away from the coast. As a result, restraint system entries may be stored locally until a time when the fisherman is closer to the coast and more reliable sources of wireless communication. Once within range of reliable wireless or wired communication, new and updated restraint system entries may be uploaded to the datastore 216 and/or interoperable system 218.

In another example, the acoustic release deck unit 206 receives a request to deploy one or more acoustic release line restraint system 202 from the gear marking system 208. The user may interact with a deploy enable button 1302 of a gear marking system 1300 of FIG. 13. The processor of the gear marking system 1300 may provide prompts to a display (not shown) with an identification number of one or more acoustic release line restraint systems.

The user of the gear marking system 208 may select a particular acoustic release line restraint system as one of multiple acoustic release line restraint system 202 deployed or retrieved by the user or other users in the similar geographical area. Once the requested acoustic release line restraint system has been identified, the user may interact with the deploy enable button 1302 of the gear marking system 1300.

In this example, the gear marking system 208 may send a request to the chartplotter 210 for a current GPS position and timestamp. In some embodiments, the gear marking system 208 may send a waypoint or Automatic Identification System (AIS) Aid to Navigation (ATON) to the chartplotter 210. A waypoint is a geographical position defined by its precise latitude and longitude. Waypoints may be utilized to define points along a route or course. The mobile computing device 214 may provide a current GPS location/position and timestamp to the software application.

The gear marking system 208 may send a request to the acoustic release deck unit 206 to deploy one or more acoustic release line restraint systems 202. For example, a user or fisherman may drop the aquatic trap including the acoustic release line restraint system 202 in the water. The gear marking system 208 and/or software application may track position, time, and/or any other information.

For retrieval, a request may be sent that includes properties such as a particular sound frequency or tone generated by the transducer 204. In some embodiments, a single tone or acoustic signal generated by the acoustic release deck unit 206 may trigger multiple acoustic release line restraint system 202 to float or rise to the surface. In various embodiments, the strength or amplitude of the acoustic signal determines the number of acoustic release line restraint system 202 that is triggered, such that an acoustic signal of a higher amplitude may trigger more acoustic release line restraint system 202 to float or rise to the surface of the water compared to another acoustic signal of a lower amplitude. In one example, a user may selectively trigger certain acoustic release line restraint systems and not others in a particular geographical area.

The gear marking system 208 may create multiple restraint system entries, each associated with a different acoustic release line restraint system 202 deployed by the acoustic release deck unit 206. As discussed herein, the gear marking system 208 may store one or more restraint system entries in a local datastore.

Figure 7:
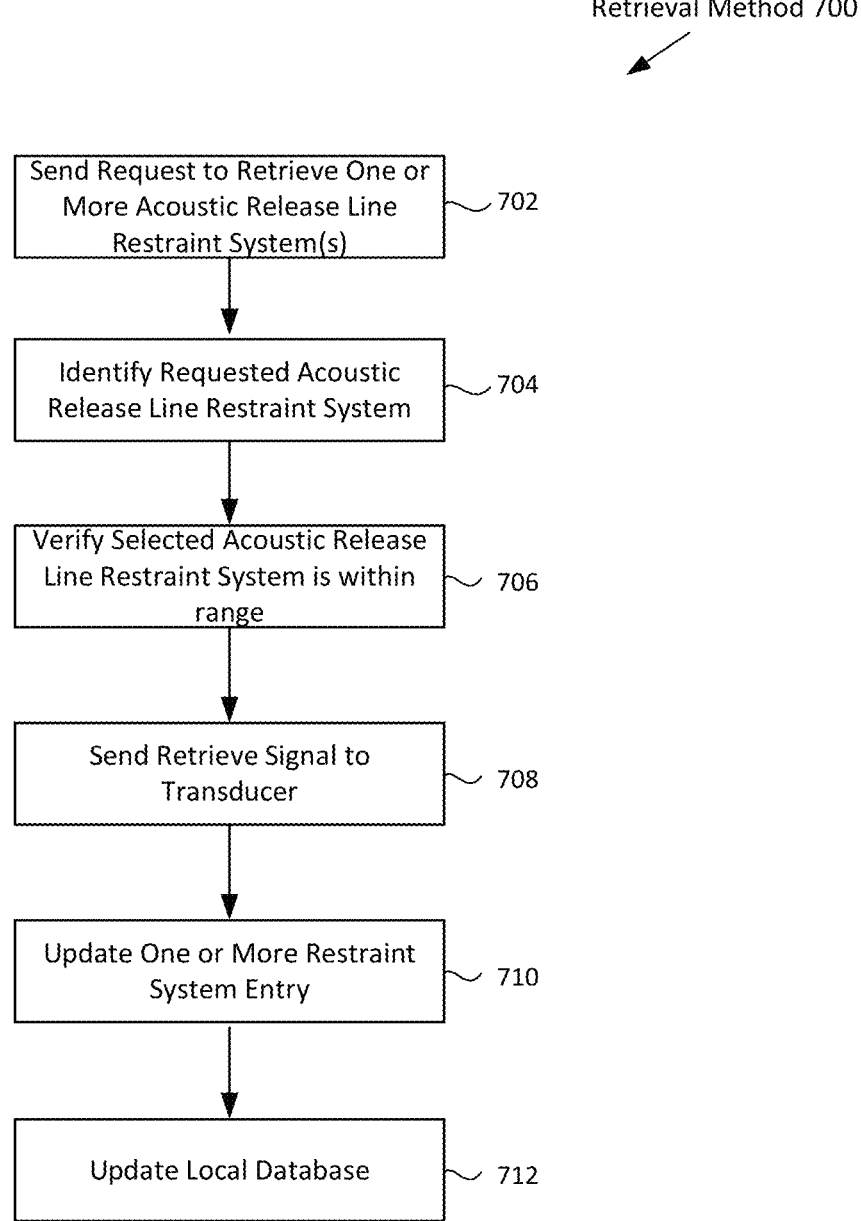
FIG. 7 depicts a flow chart of a method of retrieving aquatic traps according to some embodiments.

FIG. 7 depicts a flow chart of a retrieval method 700 according to some embodiments. In step 702, the acoustic release deck unit 206 may receive a request to retrieve one or more acoustic release line restraint system 202. As seen in FIG. 2, the acoustic release deck unit 206 may receive the request from the gear marking system 208 or the mobile computing device 214.

In one example, the acoustic release deck unit 206 receives the request to retrieve one or more acoustic release line restraint system 202 from the software application installed on the mobile computing device 214. The mobile computing device 214 user may interact with a retrieve icon 802 of a user interface 800 of FIG. 8. The user may further request that a particular acoustic release line restraint system be retrieved by inputting a unique I.D. number into an I.D. field. In the illustrated example of FIG. 8, the user requested to retrieve an acoustic release line restraint system with an I.D. number of "006."

Similar to step 304 of deployment method 300, in step 704, the software application may provide, to a display, a list of restraint system entries associated with one or more acoustic release line restraint systems deployed or retrieved by the user or other users in the similar geographical area. In one example, the list of acoustic release line restraint systems is provided to a graphics display of the mobile computing device 214. In some embodiments, a list of acoustic release line restraint systems may be provided to a display 1202 of an acoustic release deck unit 1200 of FIG. 12.

In some embodiments, the software application may provide multiple acoustic release line restraint systems that have been deployed in map form. For example, user interface 900 of FIG. 9 includes a map 902, which depicts the geographical area along with nautical information associated with the area, such as the water depth, nautical and terrestrial features such as standpipes and domes, and the like. Map 902 may include icons such as icon 904, which depicts an approximate location of a deployed acoustic release line restraint system. The user may interact with a "RETRIEVE" element in the user interface 900 to trigger retrieval of a particular deployed acoustic release line restraint system 202.

In step 706, the software application may optionally verify that the selected acoustic release line restraint system is within range of transducer 204. In some embodiments, the verification includes determining the GPS coordinates of the selected acoustic release line restraint system and comparing the system's coordinates to the mobile computing device's current GPS coordinates to determine if the transducer 204 is within the acoustic range of the selected acoustic release line restraint system. Once the software application verifies that the selected acoustic release line restraint system is within range of the transducer 204, the mobile computing device 214 may send a request to the acoustic release deck unit 206 to retrieve the selected acoustic release line restraint system. In some embodiments, the request includes an identification code or number associated with the selected acoustic release line restraint system.

In step 708, the acoustic release deck unit 206 sends the request it received from the mobile computing device 214 to retrieve the selected acoustic release line restraint system to the transducer 204. In response, the transducer 204, sends an acoustic signal into the water. The selected acoustic release line restraint system may receive and recognize the acoustic signal. In this example, in response to the acoustic signal, the acoustic release line restraint system may activate (e.g., rotate) the release cam of the line restraint device to an open state to enable the release of the release line. The release of the release line enables the float to rise to the surface. As discussed herein, the float is connected with a line that is coupled to the aquatic trap. The user may interact with an element 852, an example user interface 850 of FIG. 8 to denote that the selected acoustic release line restraint system has been successfully retrieved.

Figure 8:
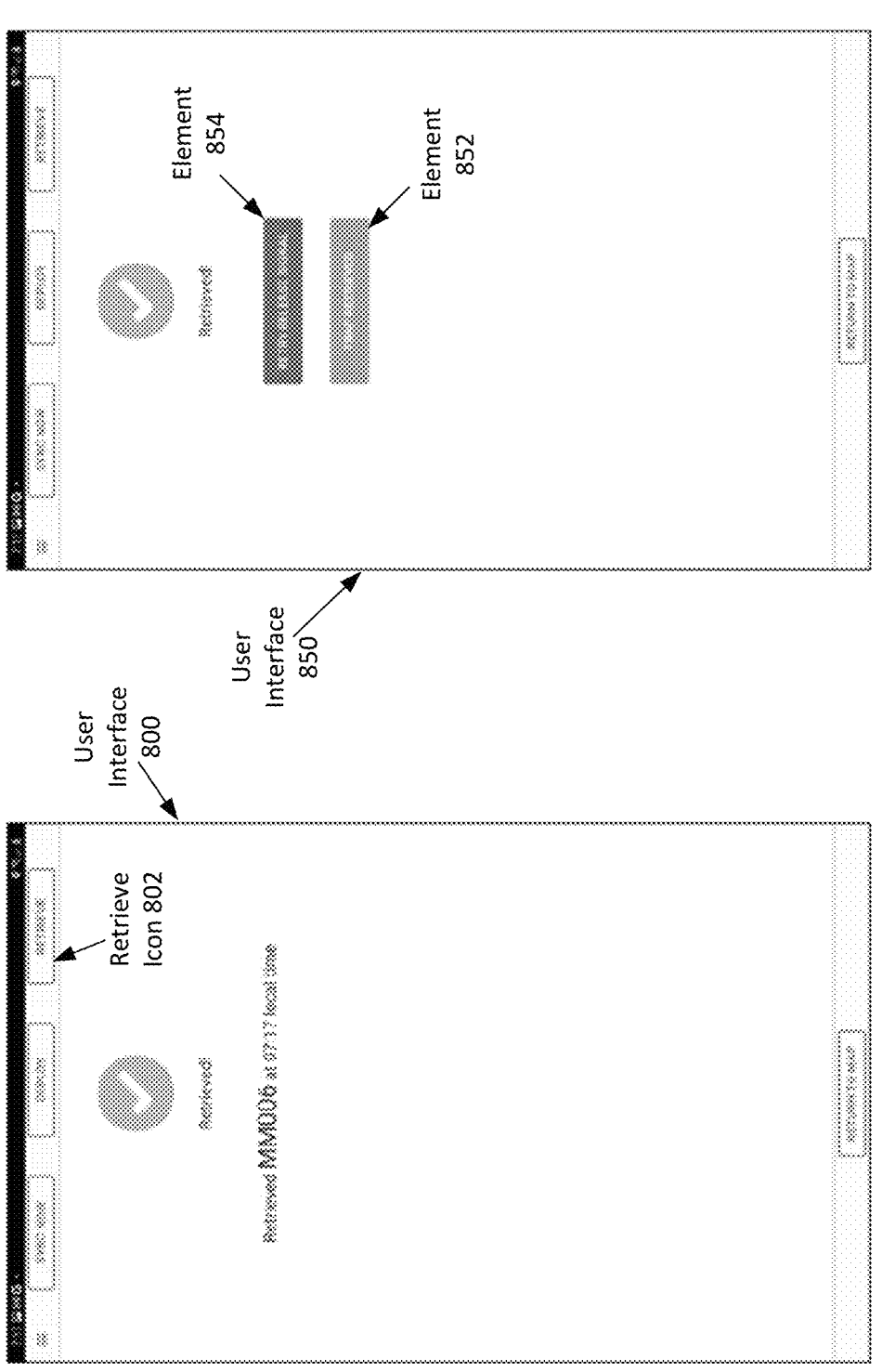
FIG. 8 depicts user interfaces to retrieve a particular acoustic aquatic trap according to some embodiments.

If the acoustic release line restraint system fails to rise to the surface of the water after a predetermined period of time, the user may interact with element 854 of FIG. 8 to retry the release signal. In response to the release signal, the transducer 204 may resend the acoustic signal into the water. If the acoustic release line restraint system still fails to rise to the surface of the water, the acoustic release deck unit 206 may send a signal to the software application informing the user that the selected acoustic release line restraint system is lost.

In step 710, the software application may create or update multiple restraint system entries, each associated with each acoustic release line restraint system deployed by the acoustic release deck unit 206. For example, the software application may update the status of the restrain system entry from "deployed" to "retrieved" with a timestamp of the time of retrieval. In some embodiments, the user of the mobile computing device 214 may interact with the user interface of the software application to input additional information, such as the contents of the acoustic release line restraint system, and/or the condition of the acoustic release line restraint system (e.g., damage to the aquatic trap or release line sustained over the course of the system's deployment).

If lost, the software application may update the status of the restrain system entry from "deployed" to "lost" with a timestamp of the time of the attempted retrieval.

In step 712, the software application may update one or more restraint system entries in a local datastore.

Figure 13:
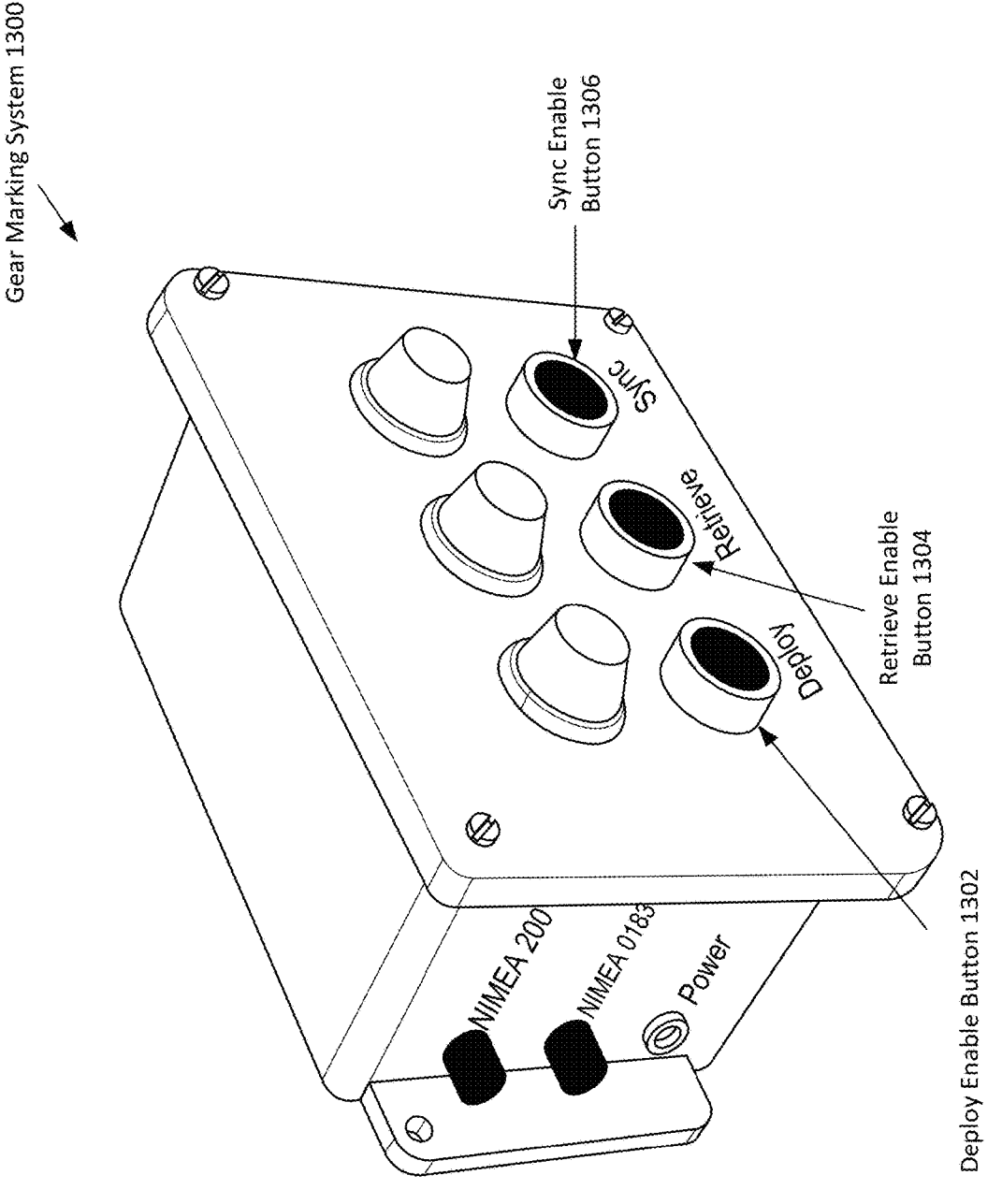
FIG. 13 depicts an image of a gear marking system according to some embodiments.

In another example, the user may interact with a retrieve enable button 1304 of the gear marking system 1300 of FIG. 13. The processor of the gear marking system 1300 may provide prompts to a display (not shown) with an identification number of one or more acoustic release line restraint systems.

The user of the gear marking system 208 may toggle through a list of acoustic release line restraint systems that have been deployed. In some embodiments, gear marking system 208 may display the multiple acoustic release line restraint systems that have been deployed on the electronic map display of the chartplotter 210. The user may identify a particular acoustic release line restraint system by interacting with the chartplotter 210. Once the requested acoustic release line restraint system has been identified, the user may interact with the retrieve enable button 1304 of the gear marking system 1300.

The acoustic release deck unit 206 may verify that the selected acoustic release line restraint system is within range of the transducer 204. As discussed herein, the verification may include determining the GPS coordinates of the selected acoustic release line restraint system and comparing that to the current GPS coordinates of the gear marking system 208. The gear marking system 208 may determine its current GPS coordinates by sending a request for coordinates from the chartplotter 210. Once the acoustic release deck unit 206 verifies that the selected acoustic release line restraint system is within range of the transducer 204, the acoustic release deck unit 206 may send a request to the acoustic release deck unit 206 to retrieve the selected acoustic release line restraint system. In some embodiments, the request includes an identification code or number associated with the selected acoustic release line restraint system. The identification code may be unique to each acoustic release line restraint system.

Figure 9:
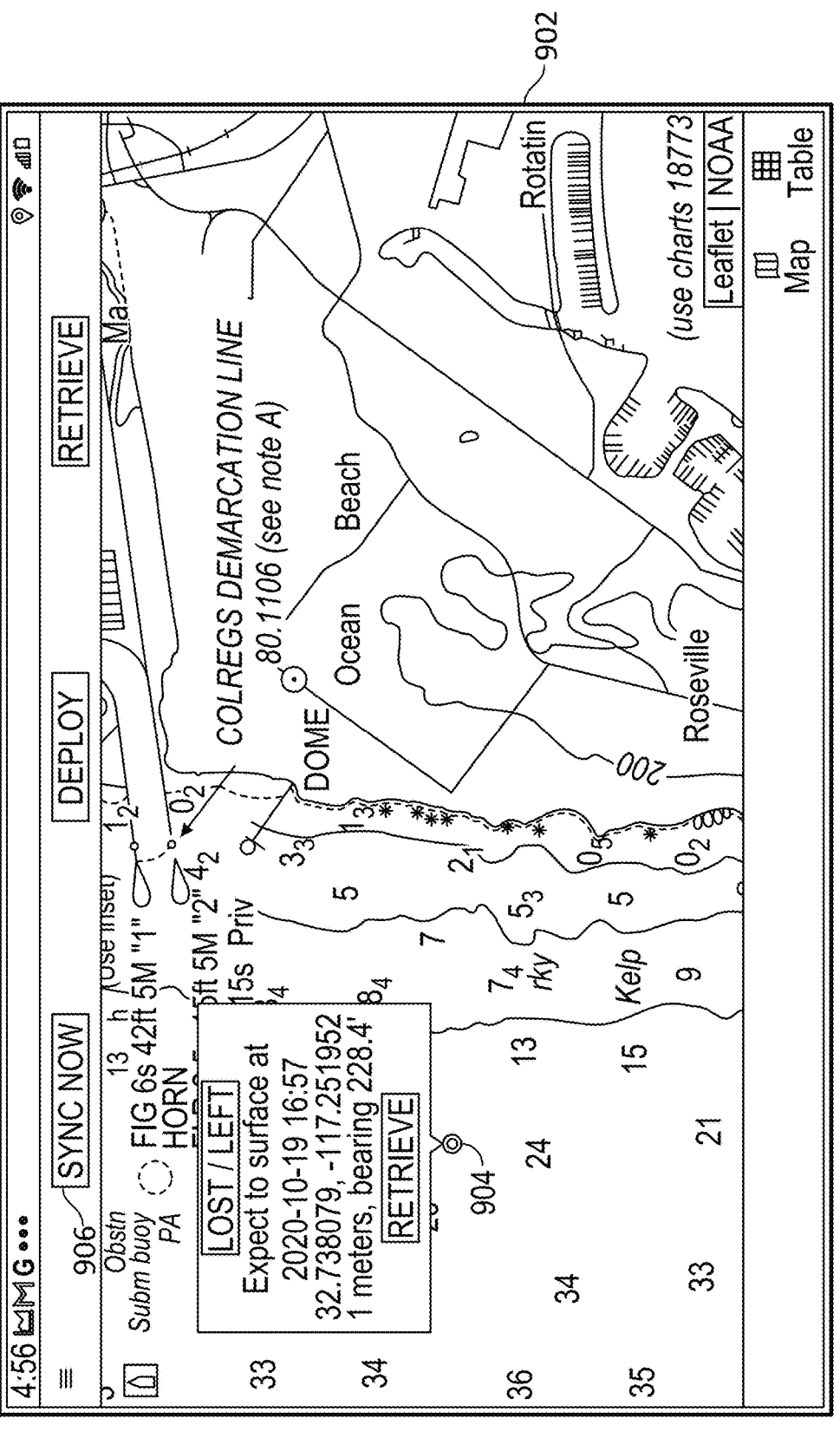
FIG. 9 depicts an area of a map on an example user interface according to some embodiments.
Figure 10:
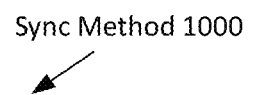
FIG. 10 depicts a flow chart of a method of synchronizing an aquatic trap database according to some embodiments.
Figure 10:
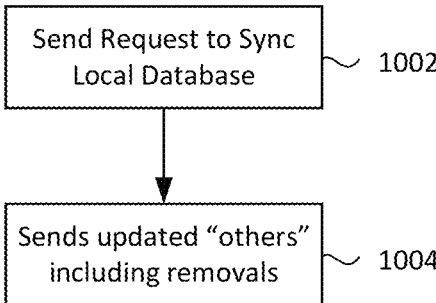

FIG. 10 depicts a flow chart of sync method 1000 according to some embodiments. In step 1002, the user may interact with the graphics display of the mobile computing device 214 to sync the local datastore of the mobile computing device 214 with the datastore 216 and/or interoperable system 218. In one example, the user may interact with a sync icon 906 of the user interface 900 from FIG. 9. In response, the mobile computing device 214 may attempt to communicate with the datastore 216. Depending on the distance of the mobile computing device 214 from the coast and/or reliable communications, the mobile computing device 214 may be able to send and receive updates to restraint system entries which may have been created or updated since the last time the mobile computing device 214 communicated with the datastore 216.

In step 1004, the local datastore of the mobile computing device 214 may be updated with restraint system entries of other fishermen. This may avoid interference with other fishing gear.

In various embodiments, the user may interact with a sync enable button 1306 of the gear marking system 1300 from FIG. 13 to sync the local datastore of the gear marking system 208 with the 216 and/or interoperable system 218.

Figure 11A:
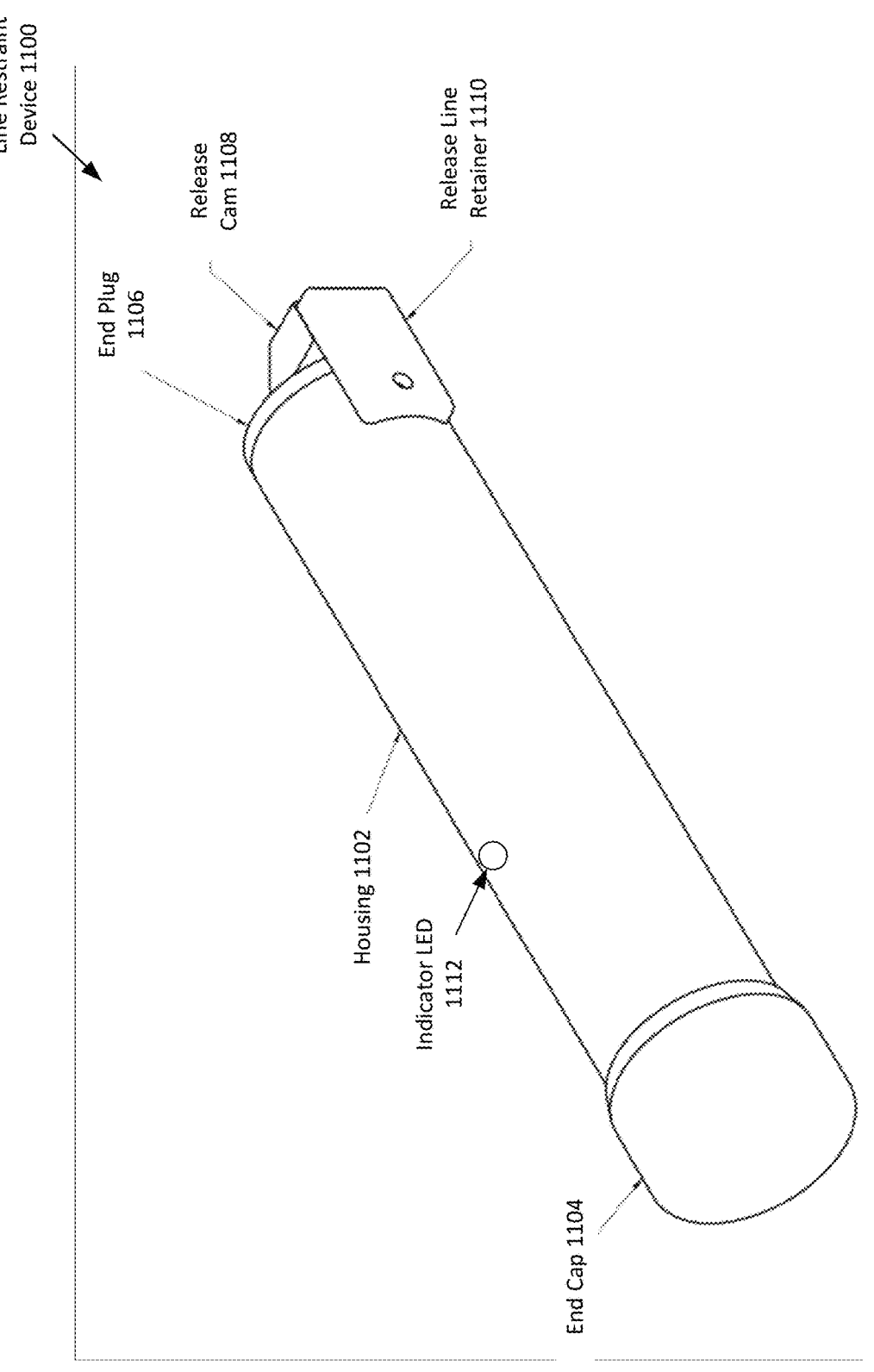
FIG. 11A depicts a first three-dimensional (3D) rendering of an aquatic trap in some embodiments.

FIG. 11A depicts a first three-dimensional (3D) rendering of a line restraint device 1100 in some embodiments. The line restraint device may be an acoustic release line restraint system 202.

The line restraint device 1100 may be cylindrical in shape with an end cap 1104 on one end opposite the end plug 1106 and release cam 1108 at the other end of the line restraint device 1100. While a cylindrical shaped device is depicted as being the line restraint device 1100, it will be appreciated that the line restraint device 1100 may be any shape, including square, circular, rectangular, polygonal, or the like.

In the example depicted in FIG. 11A, the line restraint device 1100 may include a housing 1102, an end cap 1104, an end plug 1106, a release cam 1108, a release line retainer 1110, and an indicator LED 1112. The housing 1102 may also include a motor. In one example, housing 1102 may include acrylic or polymethyl methacrylate.

The line restraint device 1100 may be coupled to the aquatic trap through any means, including, for example, metal hooks, bindings, and/or the like. In various embodiments, the line restraint device 1100 is coupled to the inside of the aquatic trap. In other embodiments, the line restraint device 1100 may be coupled to the outside of the aquatic trap.

The release cam 1108 may form or assist in forming a cavity to hold the release line. The release line retainer 1110 may keep the release line from slipping out from underneath the arm of the release cam 1108. The release line retainer 1110 may be affixed to the housing 1102 and/or the end plug 1106.

In various embodiments, the release line retainer 1110 includes an outer surface and an inner surface. The inner surface may be partially coupled to the line restraint device 1100 (e.g., through or by the housing 1102 and/or the end plug 1106). The inner surface of the release line retainer 1110 may extend beyond the end plug 1106. When the release cam 1108 is in a closed position, the face of the arm of the release cam 1108 (further discussed herein) may be directed towards the inner surface of the release line retainer 1110. This may form a cavity or hole through which the release line may be looped and retained when the release cam 1108 is in the closed position or state. When the release cam 1108 turns to the open position or state, the arm and face of the arm turn away from the inner surface of the release line retainer 1110 to create an opening in the cavity and allow the release line to escape.

When set (e.g., the release cam 1108 is in the closed state), the release line be coupled, retained, or held by the release cam 1108 and/or the release line retainer 1110. The release line holds or assists in holding the trap line in place. In various embodiments, the release cam 1108 is coupled to the motor within housing 1102. At a particular time (e.g., when an acoustic signal is received and/or at a predetermined time), the motor may turn the release cam 1108 such that the release cam 1108 is no longer touching or directed to the release line retainer 1110. The release line may slide out from underneath the restraining member of the release cam 1108 allowing the float or buoy to float to the surface. In one example, the release line retainer 1110 is optional and may be removed.

The release cam may include a first end that may be coupled to the motor within housing 1102, and an arm portion that is directed away from (e.g., perpendicular or substantially perpendicular) the stem end of the release cam 1108. The arm may have a face which is a flat or curved end that can face the release line retainer 1110 when the release cam 1108 is in the closed state.

An outer surface of the release cam 1108 that is opposite the stem end coupled to the motor may have a tapered section (e.g., tapered at a 45-degree angle) to assist in allowing the release line to slide away from the line restraint device 1100 when the motor turns the arm of the release cam 1108 away from the line restraint device 1100. In other words, the beveled section (e.g., tapered section) may assist the release line (e.g., release line 1402) to easily slip off the release cam 1108 when the release cam 1108 turns. The tapered section may be beveled or tapered at any degree of angle.

In various embodiments, the release cam 1108 and/or release line retainer 1110 form a cavity (e.g., hole) for holding and restraining a loop of the release line. When the release cam 1108 rotates, the release line is released from the cavity.

Housing 1102 may include a motor, a processor, and a sensor. The sensor may be configured to recognize an acoustic signal (e.g., emitted from the transducer 204). When the sensor recognizes the acoustic signal, the sensor may send a request to the processor to turn the release cam 1108 which will release the release line. In various embodiments, the housing 1102 includes a piezo buzzer, or piezo receiver capable of receiving and collecting vibrations from the sea and turning the vibrations into a voltage used to rotate the release cam 1108 and release a float coupled to the line restraint device 1100.

The end cap 1104 and the end plug 1106 provide protection and may seal the housing against water intrusion, even when the line restraint device 1100 is on the sea floor.

The optional indicator LED 1112 may provide an indication of the status of the line restraint device 1100. For example, if the indicator LED 1112 is flashing red, this indicates a low battery. During activation or power up, the indicator LED 1112 may initially flash a sequence of coded green flashes and then go into sleep mode where the indicator LED 1112 only flashes green once every predetermined interval. In some embodiments, predetermined interval is every 11 seconds.

Figure 11B:
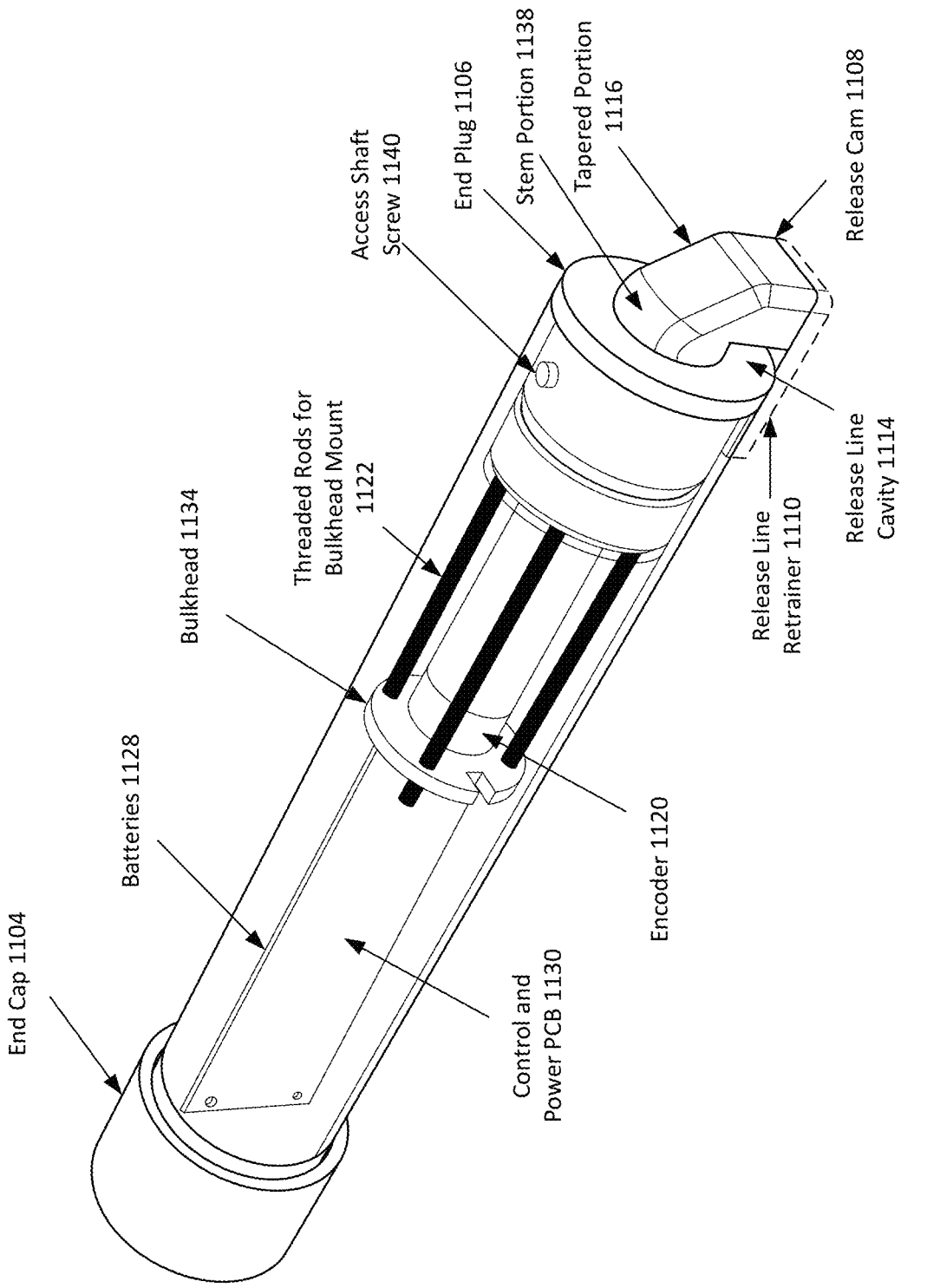
FIG. 11B depicts a second three-dimensional (3D) rendering of an aquatic trap in some embodiments.

FIG. 11B depicts a second three-dimensional (3D) rendering of a line restraint device 1100 in some embodiments. The line restraint device 1100 may be coupled to the aquatic trap through any means, including with metal hooks, bindings, and/or the like. In various embodiments, the line restraint device 1100 is coupled to the inside of the aquatic trap. In other embodiments, the line restraint device 1100 may be coupled to the outside of the aquatic trap.

The line restraint device 1100 may include the housing 1102, the end cap 1104, the end plug 1106, the release cam 1108, and the optional release line retainer 1110. The release cam 1108 includes the tapered portion 1116. The release line cavity 1114 is formed by the release cam 1108 and the release line retainer 1110 when the line restraint device 1100 is in the closed state. In the illustrated embodiment of FIG. 11B, interior components of line restraint device 1100 may be seen, including an access shaft screw 1140.

The release cam 1108 may form or assist in forming a cavity (i.e., the release line cavity 1114) to hold the release line. The release line cavity 1114 may be a hole or a divot within sold material. The release cam 1108 may comprise one or more portions that include a stem end and an arm. The release cam 1108 may, for example, form an "L" shape in which the stem end extends from the end plug 1106 and the arm forms a bend with the stem end. The arm extends outwards away from the central axis of the stem end (e.g., the central axis being a longitudinal access extending through the line restraint device 1100). The stem end may extend from an end of the housing 1102.

The stem end may be coupled to the motor or coupled to an axel that is coupled to the motor within the housing 1102. In some embodiments, the stem end is positioned at one end of the housing along a longitudinal, radial axis that runs through the middle of line restraint device 1100 down the length of the device from end to end (e.g., from end plug 1106 to end cap 1104).

The release line retainer 1110 may keep a loop of the release line from slipping out from underneath the arm of the release cam 1108. The release line retainer 1110 may be affixed to the housing 1102 and/or the end plug 1106.

Opposite the stem end, the release cam 1108 may include an arm portion. The arm portion may extend away from the longitudinal, radial axis.

As discussed herein, the release cam 1108 may form a hook or lever to create the release line cavity 1114 in order to hold or trap the release line (e.g., with a loop of the release line in the release line cavity 1114 until the release cam 1108 turns). The release line retainer 1110 may keep the release line from slipping over the release cam 1108 when the release cam 1108 is in the closed position.

The release cam 1108 may include a tapered portion 1116 to assist the release line to be freed from the release line cavity 1114 when the release cam 1108 is in or progressing to the open state. The tapered portion 1116 may be at any angle. In some embodiments, there are no tapered portions 1116.

In various embodiments, the release cam 1108 is coupled to the motor within the housing 1102. When the sensor receives an acoustic signal from the transducer 204, the motor may turn the release cam 1108 such that the release cam 1108 is no longer touching or directed to the release line retainer 1110 (e.g., opening the release line cavity 1114 such that the release line may be freed from the line restraint device 1100).

The release cam may include a first end that may be coupled to the motor within the housing 1102, and a lever portion that is perpendicular (or substantially perpendicular) to the end of the housing 1102. An outer end of the release cam 1108 that is across from the first end coupled to the motor may have a tapered section (e.g., the tapered portion 1116) to assist in allowing the release line from sliding away from the line restraint device 1100 when the release cam 1108 turns away from the line restraint device 1100.

As discussed herein, the housing 1102 may include a sensor, a motor, a processor, and controls for setting conditions for holding the release line and/or releasing the release line. The sensor may be configured to recognize a particular acoustic signal from the transducer 204 to trigger turning of the release cam 1108 to release the release line. For example, when the sensor recognizes the predetermined acoustic signal, the sensor may send a request to the processor to turn the release cam 1108 which will release the release line.

The end cap 1104 and the end plug 1106 provide protection and may seal the housing 1102 against water intrusion, even when the line restraint device 1100 is on the sea floor. The end plug 1106 may also seal the housing 1102. The end plug may be coupled to the housing 1102. The release cam 1108 may be coupled to the motor within the housing 1102 through the end plug 1106.

The access shaft screw 1140 may be accessible through the housing of the line restraint device 1100. Unscrewing the access shaft screw 1140 may enable the housing to be removed to gain access to the inner workings of the line restraint device 1100 (e.g., to change the battery 1128).

Figure 11C:
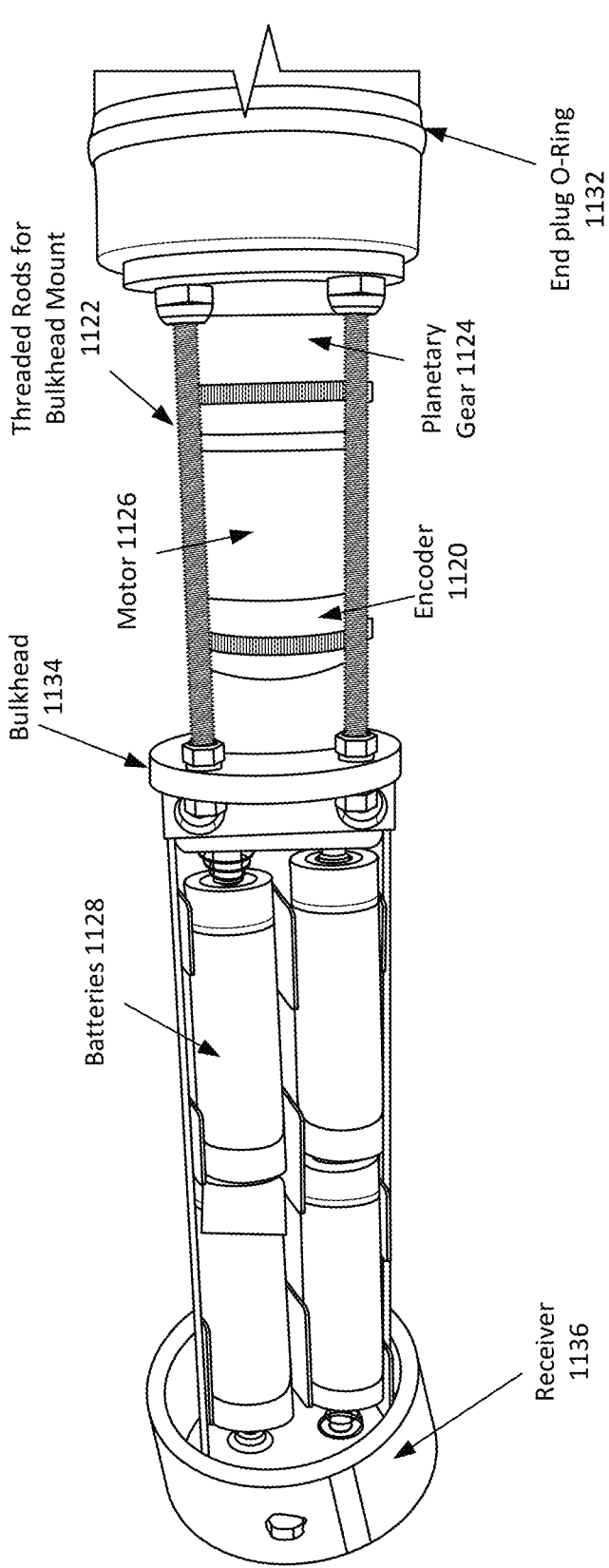
FIG. 11C depicts a view of the interior of the line restraint device according to some embodiments.

FIG. 11C depicts a view of the interior of the line restraint device according to some embodiments. In this depiction, the housing and end cap have been removed from the line restraint device 1100. It will be appreciated that the housing, end cap, and end plug 1106 may seal the inner components from getting wet when the line restraint device 1100 is submerged.

In various embodiments, the end cap and/or the housing may be decoupled from the end plug 1106. The release line retainer 1110 may be fastened to the housing in some embodiments. In various embodiments, removing the end plug 1106 may allow for access to the internal parts of the line restraint device 1100. For example, removal of the end plug 1106 may provide access to replace batteries and/or provide maintenance to other internal parts of the line restraint device 1100.

The 3D rendering of the line restraint device 1100 includes the end plug 1106, the release cam 1108, a planetary gear 1124, a motor 1126, an encoder 1120, battery 1128, control and power PCB 1130, bulkhead 1134, threaded rods for bulkhead mount 1122, access for access shaft screw 1140, and a release line retainer 1110.

The receiver 1136 may be within the end cap near the batteries 1128. It will be appreciated that the receiver 1136 may be located at any position within the line restraint device 1100. In various embodiments, the piezo buzzer(s) may be located at or near the receiver 1136.

The receiver 1136 may be configured to receive an acoustic signal such as from a transducer of a boat. The receiver 1136 may provide the signal or a digital signal based on the acoustic signal to the processor. The processor may recognize the acoustic signal (e.g., based on frequency). If the processor recognizes the acoustic signal, the processor may provide an activation signal to the release cam to trigger turning of the release cam (thereby releasing the release line as discussed herein).

In various embodiments, the line restraint device 1100 comprises a transducer configured to receive acoustic signals and provide signals (e.g., acoustic signals). For example, the transducer of the line restraint device 1100 may receive a particular acoustic signal from a transducer on a boat. If the particular acoustic signal has certain properties (e.g., the particular acoustic signal includes a code or is at a particular frequency), the processor may command the transducer to respond with a return signal (e.g., an indicator signal). The return signal could include, for example, an identifier for the particular line restraint device 1100, an identifier for an aquatic trap, battery levels, or the like. The return signal (e.g., indicator signal) could also be at an acoustic signal. Return signal could be used to determine if the equipment on the boat is within range of the desired line restraint devices 1100. In this example, the transducer of the line restraint device 1100 may receive a different acoustic signal that triggers the release cam to release the release line. In other embodiments, the line restraint device 1100 comprises a receiver that may only receive acoustic signals without returning acoustic signals.

The end plug 1106 may be circular and include a hole in the center of the plug to enable the release cam 1108 to be coupled with an axle that runs to the motor 1126. In various embodiments, the end plug 1106 may be coupled to the release line retainer 1110. The motor 1126 may be any motor. In one example, the gear reduction ratio of the motor 98 is 227:1 but any gear ratio may be used.

The end plug O-ring seal 1132 may be coupled to or near the end plug 1106. The end plug O-ring seal 1132 may assist in sealing the inner workings of the line restraint device 1100 from water when the device is submerged. The end plug O-ring seal 1132 may also assist in keeping the housing in place and positioned at or near the end plug 1106.

The planetary gear 1124 may include or be a gear wheel whose axis describes a circular path around that of another wheel. In one example, the planetary gear 1124 is a D.C. planetary gear brush motor, model number #638252 from Robotzone. The planetary gear 1124 may enable the motor to turn the release cam 1108 without disarming/arming the line restraint device 1100.

The control and power PCB 1130 includes a processor and a sensor. In some embodiments, the sensor is configured to recognize an acoustic signal sent by the transducer 204.

Once the sensor receives the acoustic signal, the sensor may send a request to the processor to trigger the motor 1126 to open the release cam 1108 from the closed state to release the release line.

By turning or otherwise manipulating the release cam 1108, the encoder 1120 may translate or assist in translating movements of the release cam 1108 to signals that can be received by the control and power PCB 1130 for arming the line restraint device 1100 or disarming the line restraint device 1100. The process is further described herein.

The battery 1128 may be any power source. In one example, the battery 1128 includes any number of A.A. batteries, AAAA batteries, lithium batteries, or the like. In some embodiments, the battery 1128 may power the control and power PCB 1130, and/or the motor 1126. In some embodiments, the power source may include a spring/coil powered system and/or the like.

The line restraint device 1100 depicted in FIG. 9 includes bulkhead 1134. The bulkhead 1134 may provide support for the threaded rods (e.g., the bulkhead mount 1122) which provides structural support and protection for the motor 1126 and the planetary gear 1124.

Figure 12:
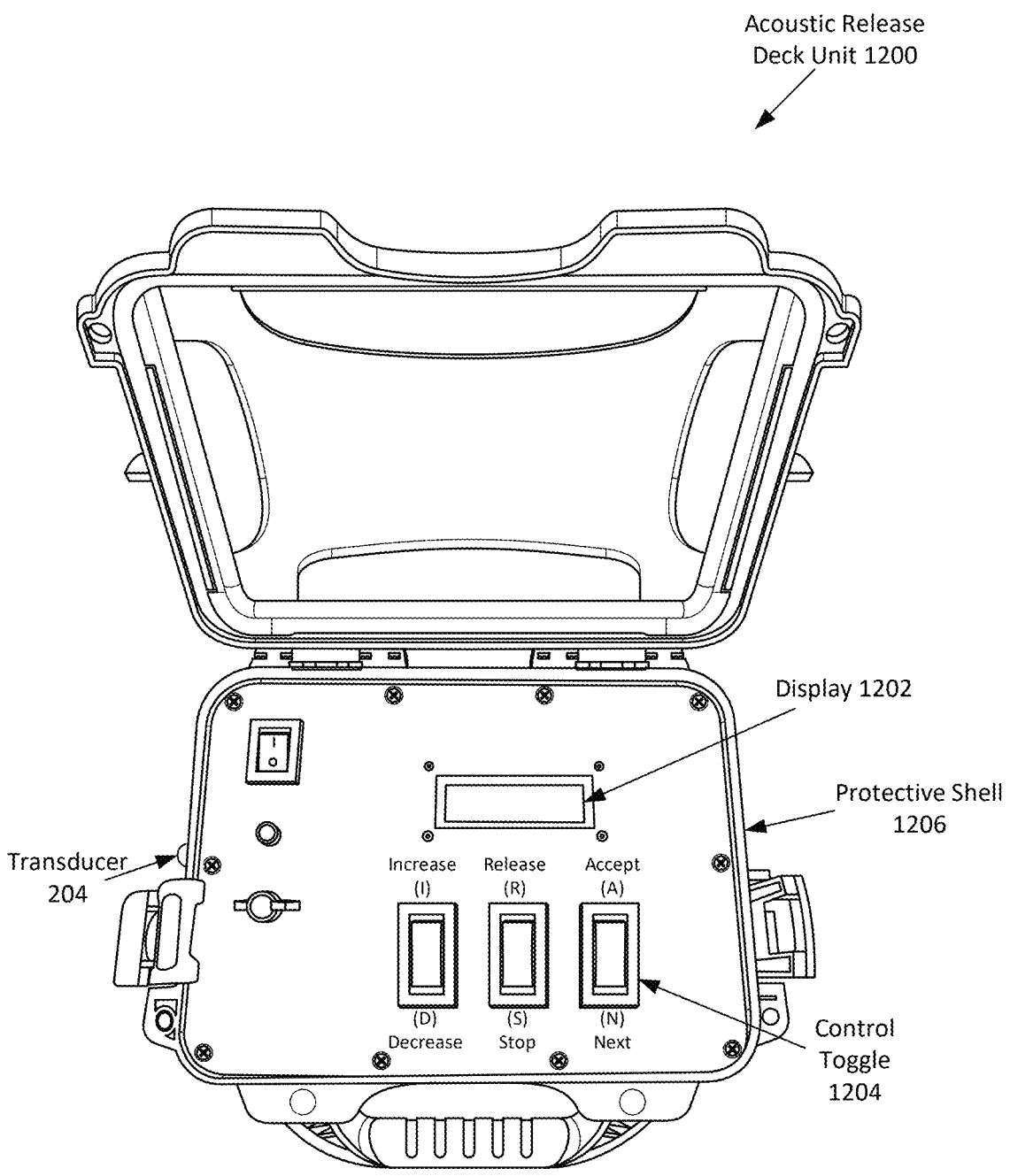
FIG. 12 depicts an image of an acoustic release deck unit according to some embodiments.

FIG. 12 depicts an image of the acoustic release deck unit 1200 according to some embodiments. The acoustic release deck unit 1200 includes a waterproof electronics box and transducer 204. The acoustic release deck unit 1200 communicates with a software application installed on the mobile computing device 214 via a Bluetooth connection.

Figure 14A:
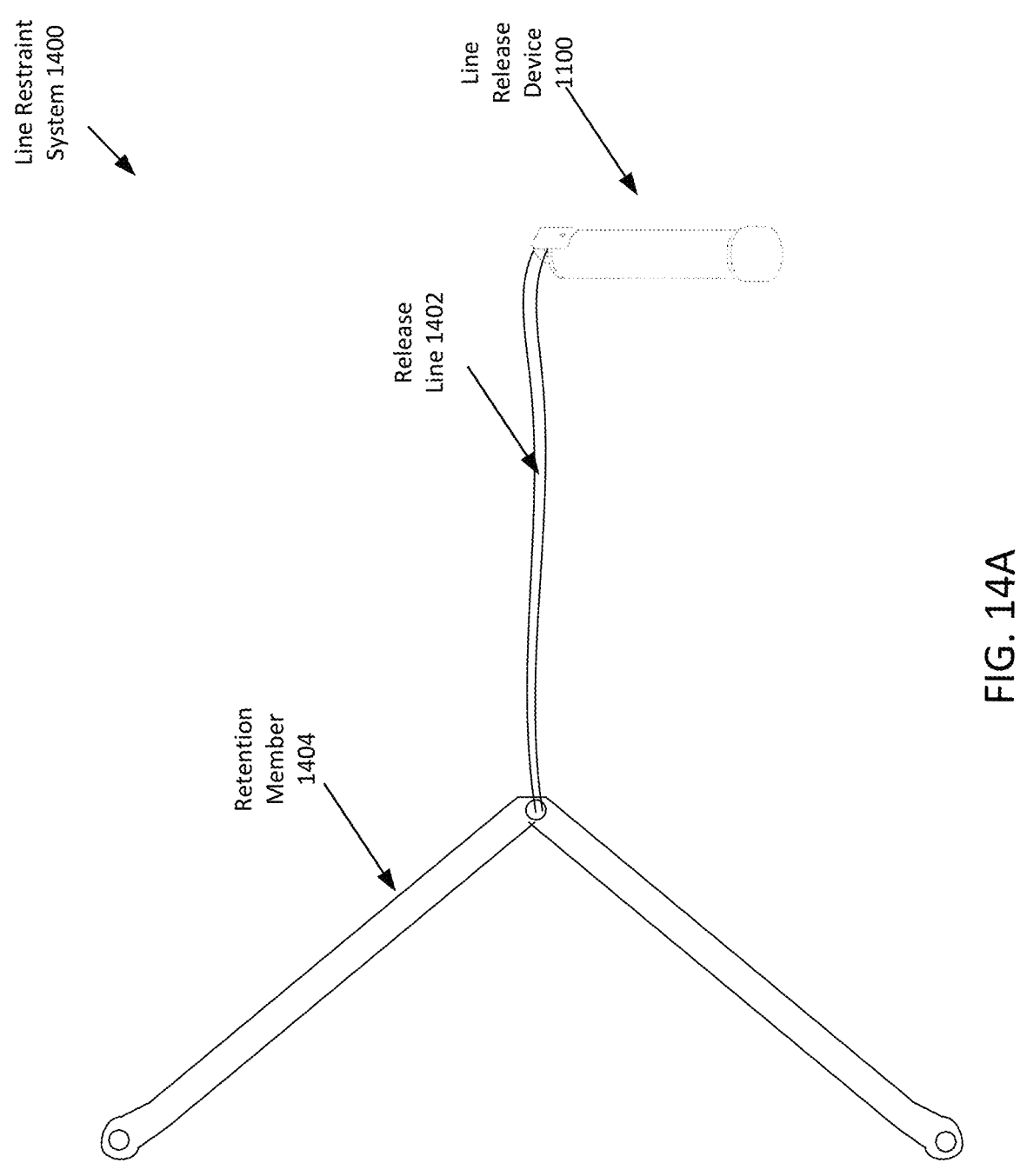
FIG. 14A depicts a line restraint system in some embodiments.

FIG. 14A depicts a line restraint device 1100 in some embodiments. The line restraint system 1400 may include the line restraint device 1100, the release line 1402, and retain member(s) 1404. The retain member(s) 1404 may include a single retention member 1404, two retain members 1404, or more. In one example, the retention member 1404 may be "V" shape. Each end of the "V" shape may be coupled to the outside of an aquatic trap (e.g., through rings, hooks, rope, and/or otherwise). One point of the retention member 1404 may be coupled to an end or portion of the release line 1402.

The trap line may be coiled and all or of the trap line positioned underneath all or part of the retention member(s) 1404. Similarly, all or part of the coiled trap line may be positioned underneath at least part of the release line 1402.

Two ends of the release line 1402 may be coupled to the retention member(s) 1404 to form a loop. The other end of the loop of the release line 1402 may be coupled to the release cam 1108 of the line restraint device 1100. In one example, the loop of the release line 1402 may be looped around the release cam 1108. In another example, one end of the release line may be coupled to the retention member(s) 1404 and the other tied to form a loop or otherwise releasably tied or looped around the release cam 1108.

There may be any number of retention members 1404. In some embodiments, each retention member 1404 may form a separate leg where one end of each retention member is coupled to the aquatic trap and the other end coupled or otherwise held in place by the release line 1402. When the line restraint device 1100 releases one end of the release line 1402, the float or buoy will pull and uncoil the trap line. The pressure from the buoy will force the trap line to escape the loose and/or open retention members 1404 and/or remaining release line 1402.

Figure 14B:
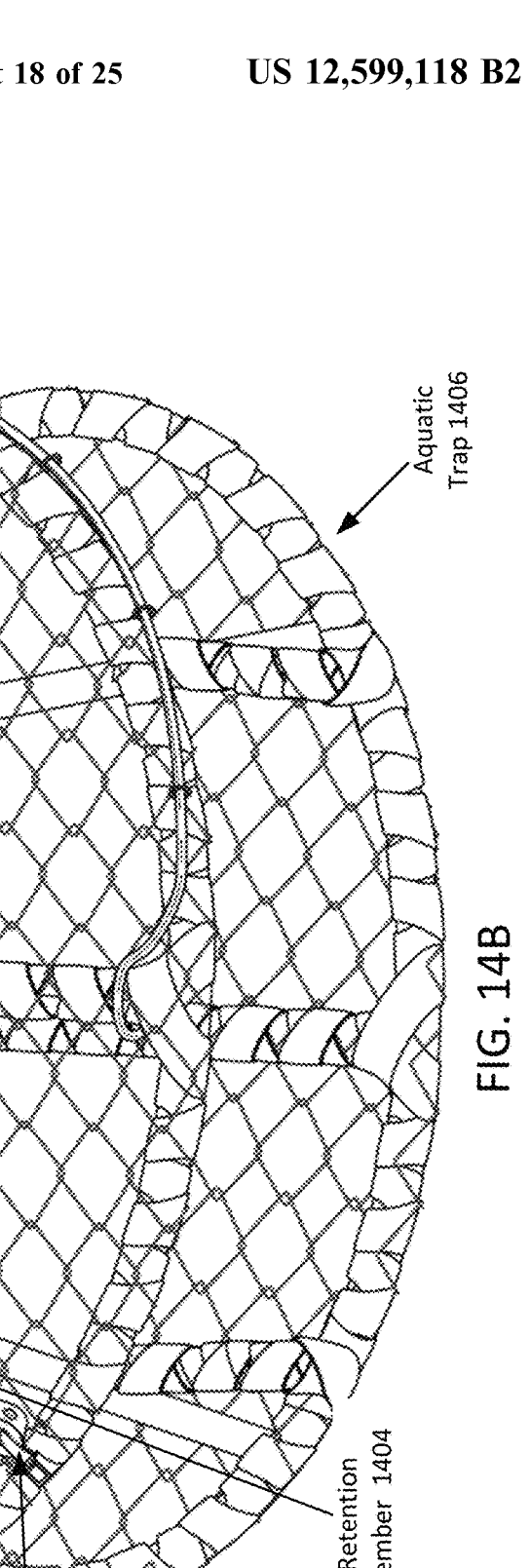
FIG. 14B depicts a circular aquatic trap with the line restraint system in some embodiments.

FIG. 14B depicts a circular aquatic trap 1406 (e.g., a Dungeness crab pot) with the line restraint device 1100 in some embodiments. In this example, the trap line (discussed herein) may be coiled and secured to the top of the aquatic trap 1406 using the release line 1402 (e.g., a bungee loop)

and the timed release of the line restraint device 1100. Each of the retention members 1404 is separately coupled to an edge of the aquatic trap 1406. It will be appreciated that the retention members 1404 may be coupled to any portion of the aquatic trap 1406. The retention members 1404 as depicted in FIG. 3B are on the outside of the aquatic trap 1406. Each end of the retention members 1404 that are coupled to the aquatic trap 1406 may be coupled to the aquatic trap with locking member 1408 which may be a ring, strap, or other connector.

In this example, the release line 1402 extends from the line restraint device 1100, through a loop (e.g., D ring 1412) in the center of the aquatic trap 1406, and then to the retention member(s) 1404. The D ring 1412 may be coupled to the aquatic trap 1406 and the release line 1402 may be wrapped around the ring (e.g., with one winding or one wrap around a part of the ring). The optional D ring 1412 may serve to secure the coiled trap line. When the release line 1402 is released from the line restraint device 1100, the release line 1402 may be pulled from all or part of the D ring 1412 by the force of the trap line being pulled by the buoy is it floats towards the surface.

Similarly, the line restraint device 1100 may be coupled to the aquatic trap by one or more device locks 1410. The device locks 1410 may include one or more metal rings or bands configured to hold the line restraint device 1100 to a portion of the aquatic trap 1406 (e.g., inside the aquatic trap 1406). It will be appreciated that the line restraint device 1100 may be held to the aquatic trap 1406 in any number of ways (e.g., using rope, a bracket, rings, straps, and/or the like).

Figure 15:
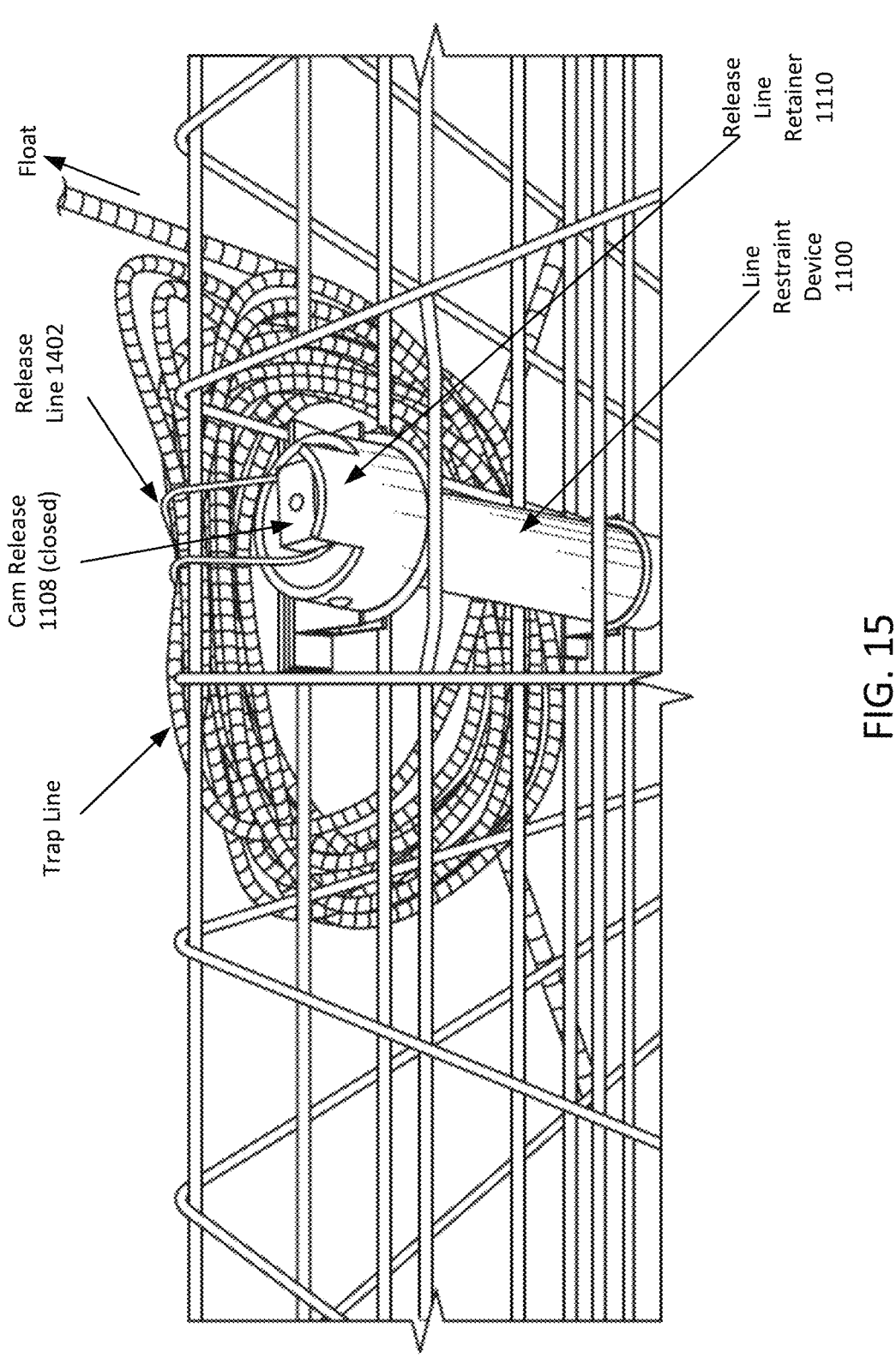
FIG. 15 depicts a line restraint device holding a release line that holds the coiled trap line in place in some embodiments.
Figure 16:
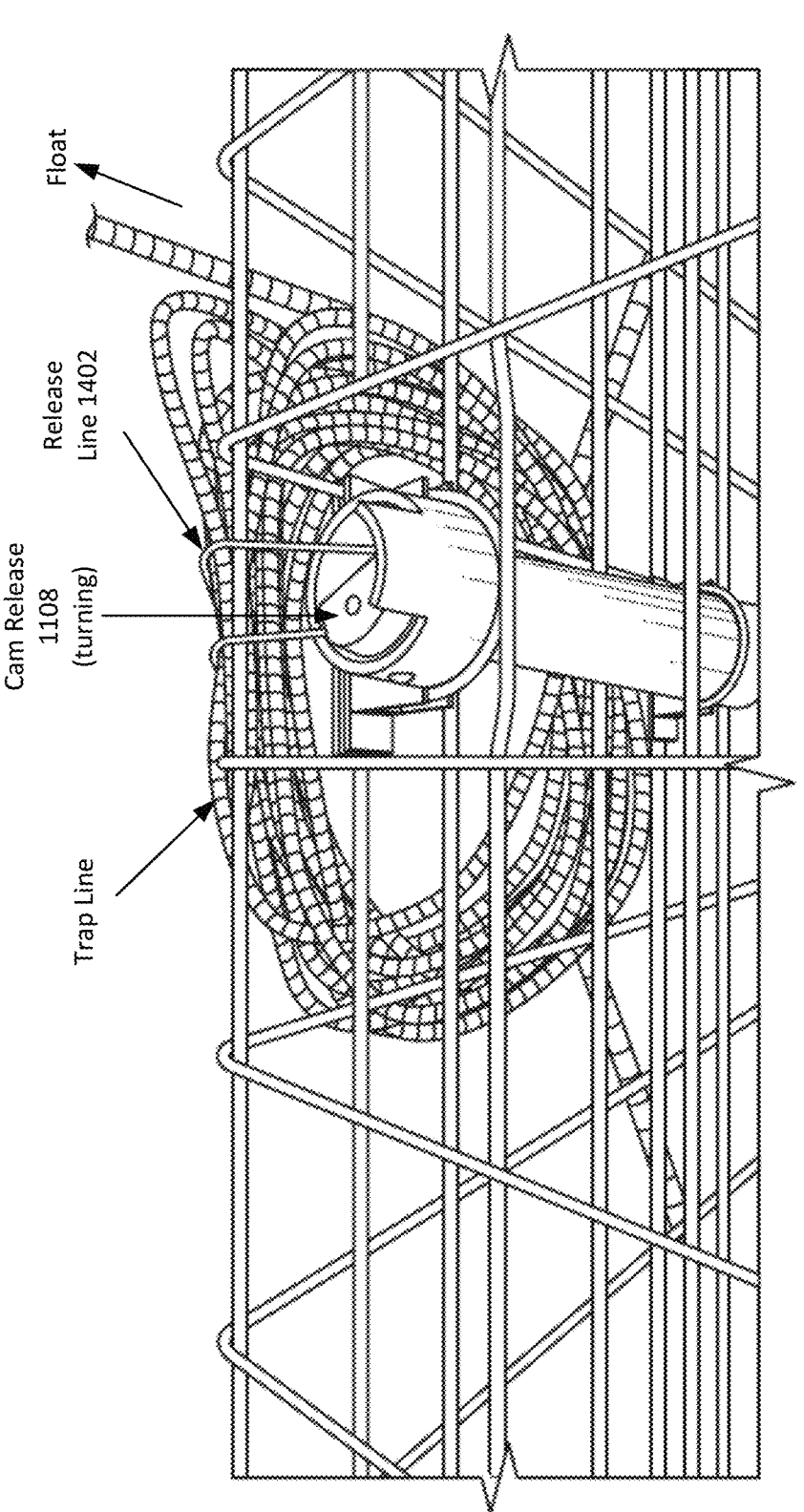
FIG. 16 depicts the line restraint device turning the release cam to release the release line and free the coiled trap line in some embodiments.
Figure 17:
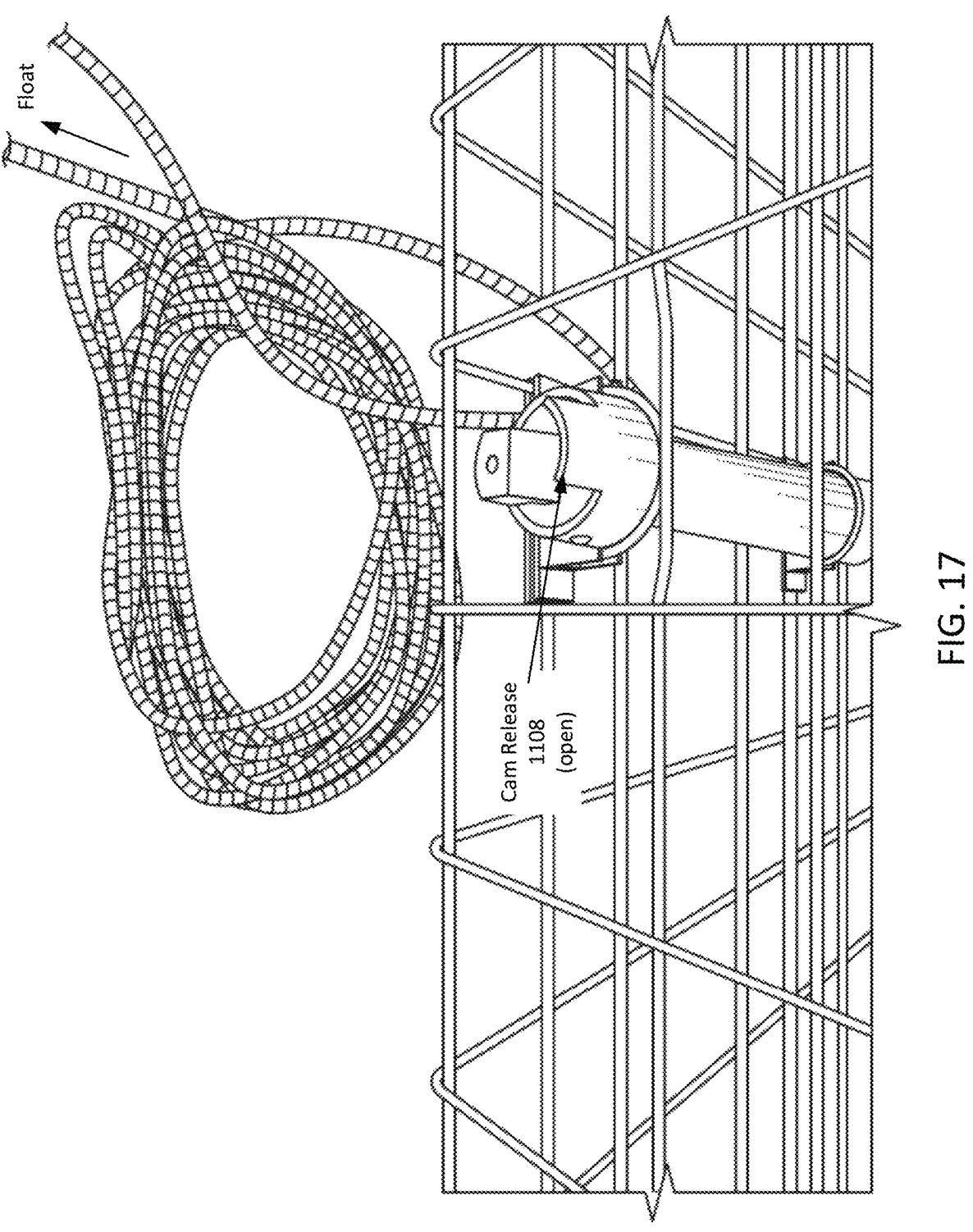
FIG. 17 depicts the line restraint device in an open state according to some embodiments.

FIGS. 15-17 depict the line restraint device 1100 holding and releasing the release line 1402 in one example. As discussed herein, an acoustic signal may be received to trigger release of the trap line so that the buoy will pop up when desired, thus reducing exposure and risk for entanglement of nearby whales.

For turnaround/retrieval, the float will be at the surface when the fisherman arrives and the aquatic trap may be recovered using normal handling gear. The line restraint device 1100 could then be re-set, and the aquatic trap could be redeployed.

At the time of deployment, the real-time geolocation system may be used to mark the location of the trap and transmit that location to a database of regional trap locations. The geolocation system is also used to display the locations of other nearby traps so that interference can be avoided. For regulatory purposes, enforcement personnel could monitor trap deployments via the geolocation database.

FIG. 15 depicts a line restraint device 1100 holding a release line 1402 which retains the coiled trap line in place in some embodiments. In this figure, the aquatic trap 1406 has already been deployed and is on the sea floor. The release line 1402 may be, for example, a bungee cord, rope, or any other kind of line.

In FIG. 15, the release cam 1108 is in the closed position where the release cam 1108, the end cap 1104, and the release line retainer 1110 form a cavity that the release line 1402 runs through. The release cam 1108, the end cap 1104, and the release line retainer 1110 may retain or otherwise restrain the release line 1402 which holds the trap line as well as the float at or near the aquatic trap 1406. One end of the trap line is coupled to the float or buoy which is floating at or immediately about the aquatic trap 1406. The float or buoy is constrained from floating to the surface because the trap line is held in place at least partially by the release line 1402.

FIG. 16 depicts the line restraint device 1100 turning the release cam 1108 to release the release line 1402 and free the coiled trap line in some embodiments. In FIG. 16, the line restraint device 1100 may be triggered the motor to turn (e.g., rotate) the release cam 1108 which will open the cavity and release the loop of the release line 1402 from the line restraint device 1100 when the sensor of the line restraint device 1100 receives an acoustic signal from the transducer 204.

FIG. 17 depicts the line restraint device 1100 in an open state in some embodiments. The release cam 1108 may turn to open the cavity and release the release line 1402. The release line 1402 may no longer restrain the coiled trap line when the line restraint device 1100 is in the open state. Once the release line 1402 escapes from the line restraint device 1100, the buoy starts to float towards the surface. The trap line then extends between the buoy and the aquatic trap to enable retrieval of the aquatic trap.

The trap line is depicted in FIG. 17 as floating away from the aquatic trap as the float pull towards the surface.

Figure 18:
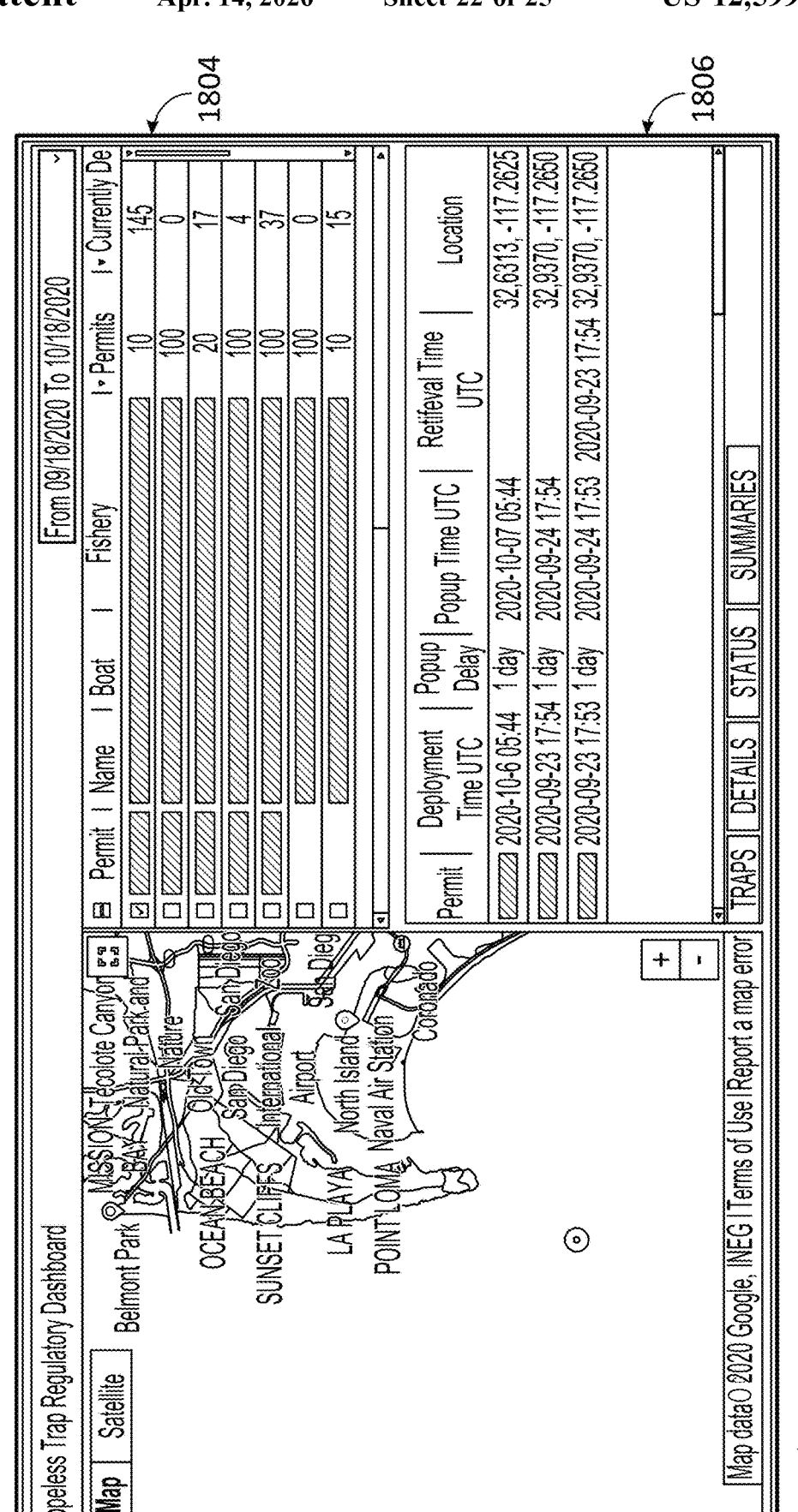
FIG. 18 depicts an example user interface of the interoperable system according to some embodiments.

FIG. 18 depicts a user interface 1800 of the interoperable system according to some embodiments. The interoperable system may be under the operation of the Ropeless Manufacturer's Workgroup (RMW), which is a cooperative effort between nine companies in the "on-demand" fishing gear industry. Ropeless Regulatory Web Portal is a regulatory website (Ropeless Regulatory Portal) that provides CDFW Law Enforcement and Marine Region Staff access to data associated with users that are, or had been, fishing with ropeless gear. The website includes three main panels including a map view 1802, a fisher table 1804, and a data table 1806. These views can all be filtered based on the data parameters of the database. In general, the data in the fisher table 1804 may be first filtered in the fisher window by fishery, date, and then fishers within that fishery can be selected based on name, vessel name, and/or permit number. The filtered data are then displayed in the map view and the data view. The data view also provides multiple tabs to view general information, detailed information, and summary statistics associated with the filtered data.

Figure 19:
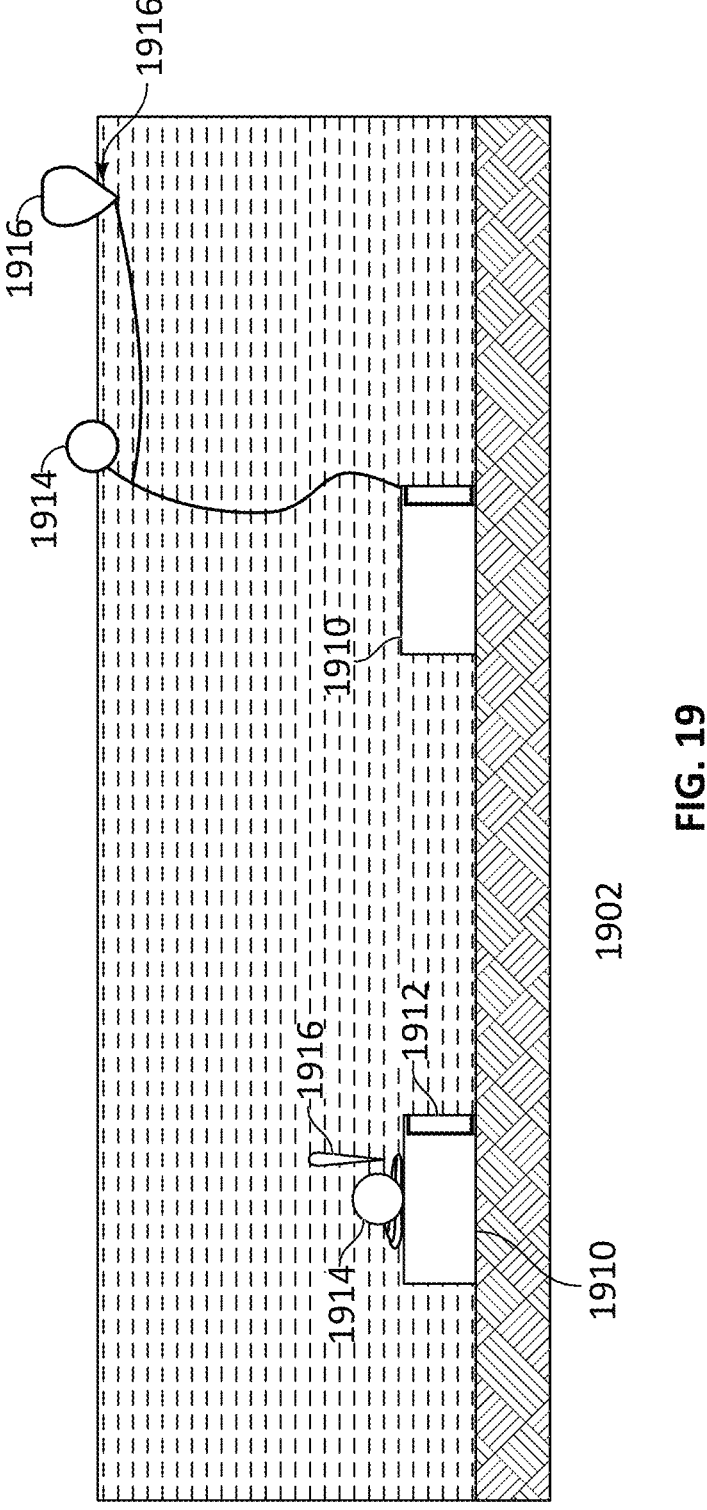
FIG. 19 depicts a self-compensating buoy according to some embodiments.

FIG. 19 depicts a self-compensating buoy according to some embodiments. An acoustic release line restraint system 1910, such as the line restraint system 1400 of FIG. 14A, may have previously been deployed by a fisherman and is sitting on sea floor 1902. The 1910 includes a line restraint device 1912, such as the line restraint device from FIG. 11A through 11C, coupled to a hard float 1914 and a secondary float 1916 via release lines. The hard float 1914 may be a high density foam float while the secondary float includes a compressible material enveloping or encasing a float which may be filled with air.

When a sensor of the line restraint device 1912 receives and recognizes the acoustic identification code, the release cam of the line restraint device may be activated to rotate the release cam to an open stable to enable the release of the release line which frees the hard float 1914 and secondary float 1916 coupled to the release line.

Higher density foam float of the hard float 1914 may be more resistant to crushing by the constant subjection to the high water pressure from being underwater. As the secondary float 1916 is submerged in the water along with the aquatic trap and line restraint device 1912, the pressure from the water may compress the secondary float 1916. The hard float 1914 may provide steady buoyancy, and as the acoustic release line restraint system 1910 and the secondary float 1916 rise from the sea floor 1902 and feel less water pressure from the sea water, the secondary float 1916 may start to decompress or fill with air. The secondary float 1916 may include a buoyant force that is greater than that of the hard float 1914.

Figure 20:
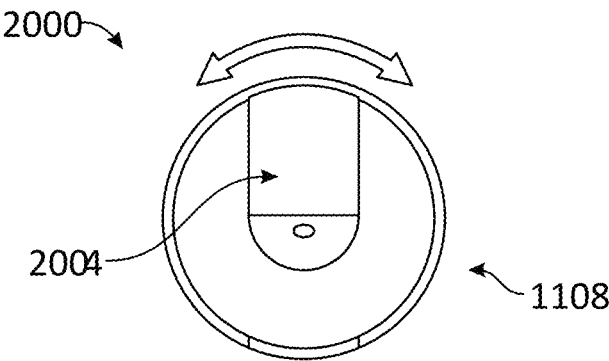
FIG. 20 depicts a process for arming and disarming the line restraint device in some embodiments.
Figure 20:
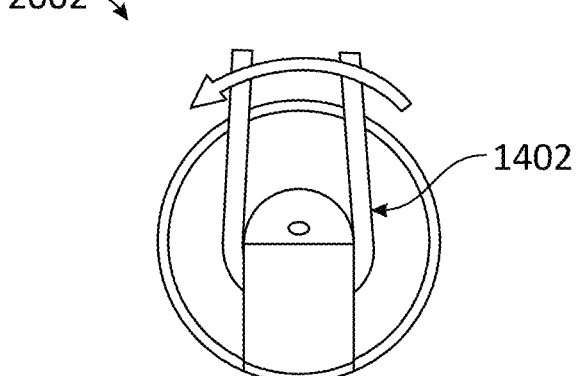
Figure 20:
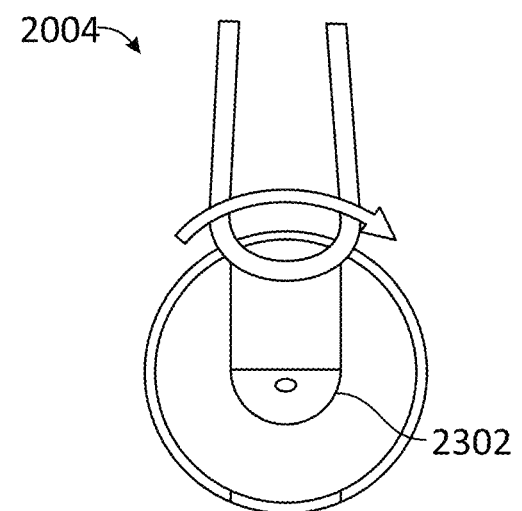

FIG. 20 depicts a process for arming and disarming the line restraint device in some embodiments. In some embodiments, the user may turn the arm 2004 to arm the line restraint device 1100. The figures in FIG. 20 depict a top view from the top end of the line restraint device 1100. The top end of the line restraint device 1100 includes the outer surface of the arm 2004. The red arrows depict the direction that the user may turn the arm 2004 (and turn the release cam 1108).

In configuration 2000, the arm 2004 is in a disarmed position, the user may turn the arm 2004 in either direction to set the line restraint device 1100, as indicated by the arrows the arm 2004. The arm 2004 may be rotated approximately 180° until resembles configuration 2002. In this configuration, the release line 1402 may be looped or hooked around the 1004. When the sensor receives a predetermined acoustic signal from the transducer 204, the motor may turn the release cam 1108 such that the release cam 1108 is no longer touching or directed to the release line retainer 1110 (e.g., opening the release line cavity 1114 such that the release line may be freed from the line restraint device 1100.

After the line restraint device 1100 is armed (e.g., the line restraint device 1100 is in a configuration to retain the release line), the user may disarm the line restraint device 1100 by turning the arm 2004 to a position which allows the release line 1402 to be released from the cavity.

In configuration 2004, the float may pull on the trap line, which is coiled and held in place, at least in part, by the release line 1402. When the release line 1402 is released by the line restraint device 1100, the float may pull the trap line which may force and/or pull the release line 1402 out of the cavity. In various embodiments, the release cam 1108 includes a tapered portion 1116 that may incline from the arm 2004 to the opposite edge of the stem portion 1138. The tapered portion 1116 may assist the release line 1402 to pull free from the cavity and slide over all or part of the tapered portion 1116. The tapered portion 1116 may be at any angle and may be sloped such that the part of the tapered portion 1116 closest to the arm 2004 is upward, away from the housing, and the opposite part of the tapered portion 1116 closest to the stem portion 1138 is downwards, towards the housing.

Figure 21:
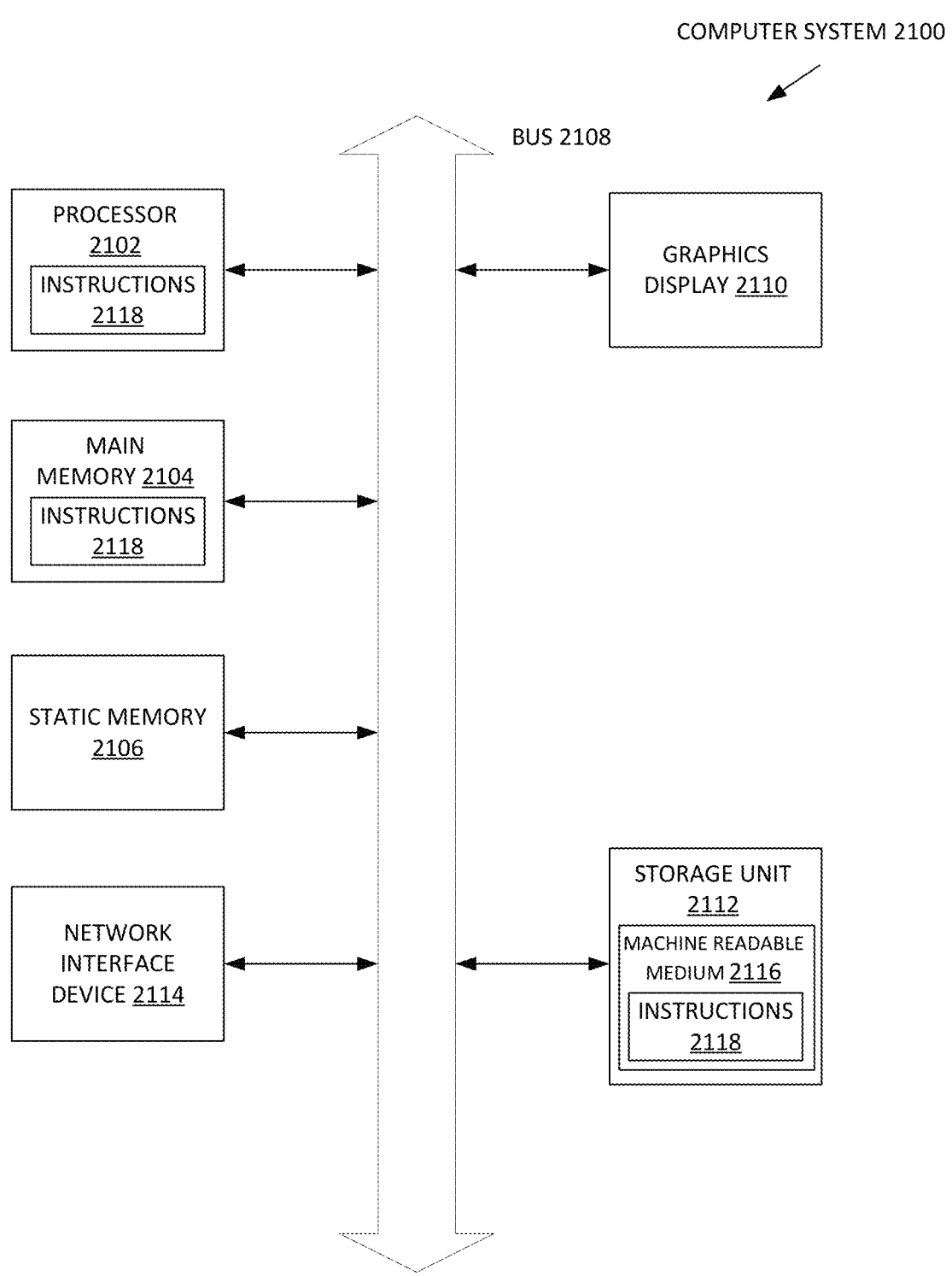
FIG. 21 is a block diagram illustrating entities of an example digital device able to read instructions from a machine-readable medium and execute those instructions in a processor to perform the machine processing tasks discussed herein, such as the engine operations discussed above.

FIG. 21 is a block diagram illustrating entities of an example digital device able to read instructions from a machine-readable medium and execute those instructions in a processor to perform the machine processing tasks discussed herein, such as the engine operations discussed above. Specifically, FIG. 21 shows a diagrammatic representation of a digital device in the example form of a digital device 2100 within which instructions 2124 (e.g., software) for causing the machine to perform any one or more of the methodologies discussed herein may be executed. In alternative embodiments, the machine operates as a standalone device or may be connected (e.g., networked) to other machines, for instance, via the Internet.

The digital device may include a processor and memory any may include a PIC, processor, raspberry P.I., or the like.

The example digital device 2100 includes a processor 2102 (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 2104, and a static memory 2106, which are configured to communicate with each other via a bus 2108. The digital device 2100 may further include a graphics display unit 2110 (e.g., a plasma display panel (PDP), a liquid crystal display (LCD), a projector, or a cathode ray tube (CRT)). The digital device 2100 may also include a data store 2112 and a network interface device 2114, which also are configured to communicate via the bus 2108.

The data store 2112 includes a machine-readable medium 2116 on which is stored instructions 2118 (e.g., software) embodying any one or more of the methodologies or functions described herein. The instructions 2118 (e.g., software) may also reside, completely or at least partially, within the main memory 2104 or within the processor 2102 (e.g., within a processor's cache memory) during execution thereof by the digital device 2100, the main memory 2104 and the processor 2102 also constituting machine-readable media. The instructions 2118 (e.g., software) may be transmitted or received over a network (not shown) via optional network interface 2114.

While machine-readable medium 2116 is shown in an example embodiment to be a single medium, the term "machine-readable medium" should be taken to include a single medium or multiple media (e.g., a centralized or distributed database, or associated caches and servers) able to store instructions (e.g., instructions 2118). The term "machine-readable medium" shall also be taken to include any medium that is capable of storing instructions (e.g., instructions 2118) for execution by the digital device and that cause the machine to perform any one or more of the methodologies disclosed herein. The term "machine-readable medium" includes, but should not be limited to, data repositories in the form of solid-state memories, optical media, and magnetic media.

In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as any number of separate programs, or as one or more statically or dynamically linked libraries. It will be understood that the named modules described herein represent one embodiment, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable persistent storage device (e.g., hard disk), loaded into the memory, and executed by one or more processors as described above in connection with FIG. 21. Alternatively, hardware or software modules may be stored elsewhere within a computing system.

As referenced herein, a computer or computing system includes hardware elements used for the operations described here regardless of specific reference in FIG. 21 to such elements, including, for example, one or more processors, high-speed memory, hard disk storage and backup, network interfaces and protocols, input devices for data entry, and output devices for display, printing, or other presentations of data. Numerous variations from the system architecture specified herein are possible. The entities of such systems and their respective functionalities can be combined or redistributed.

The invention claimed is:

1. A line restraint system comprising:
   a housing;
   a processor;
   a motor contained within the housing, the housing sealing the motor and the processor from getting wet when the housing is submerged;
   a release cam extending from the housing, the release cam comprising a stem portion and an arm portion opposite the stem portion, the stem portion being proximate to the housing, the arm portion being opposite the stem portion and away from the housing, the arm portion extending away from the stem portion of the release cam, the stem portion being rotatably coupled to the motor, the motor being configured to turn the arm portion of the release cam between an open state and a closed state, when the stem portion of the release cam rotates to the closed state, the stem portion and an overhang of the arm portion of the release cam at least partially defining a cavity capable of retaining a release line, wherein the cavity extends from an outer surface of the housing to an inner surface of the overhang of the arm portion, when the stem portion of the release cam rotates to the open state, the release cam opening the cavity to enable release of the release line; and
   a receiver configured to receive an acoustic signal, the processor being configured to trigger the release cam to turn based on the acoustic signal.

2. The line restraint system of claim 1, further comprising a release line retainer coupled to the line restraint system, a portion of the release line retainer extending from the housing, and wherein in the closed state, the arm portion of the release cam being directed towards the release line retainer, the release line retainer and the overhang of the arm portion of the release cam at least partially defining the cavity.

3. The line restraint system of claim 1, wherein the line restraint system is capable of being coupled to an aquatic trap and capable of holding the release line in the cavity when the line restraint system is in the closed state, thereby enabling a trap line coupled to a buoy to be restrained from rising when the aquatic trap is deployed underwater.

4. The line restraint system of claim 1, wherein the processor being configured to trigger the release cam to turn based on the acoustic signal comprises the processor being configured to trigger the release cam to turn if the acoustic signal is of a particular frequency.

5. The line restraint system of claim 1, wherein the processor being configured to trigger the release cam to turn based on the acoustic signal comprises the processor being configured to trigger the release cam to turn if the acoustic signal has one or more particular properties.

6. The line restraint system of claim 1, further comprising is piezo receiver configured to convert vibrations to a voltage to turn the release cam.

7. The line restraint system of claim 1, wherein the receiver is a transducer configured to provide an indication signal, the indication signal being directed to outside of the housing, the indication signal being acoustic.

8. The line restraint system of claim 7, wherein the indication signal includes an identifier that identifies the line restraint system.

9. The line restraint system of claim 1, wherein the line restraint system is capable of being coupled to at least one bar within an inside of an aquatic trap, the aquatic trap comprising the at least one bar within its structure.

10. A method comprising:

receiving, by a processor of a line restraint system, an acoustic signal, the line restraint system including a housing;

triggering, by the processor, an activation signal based on the acoustic signal, the processor being within the housing; and turning, in response to the activation signal, a release cam of the line restraint system, the release cam extending from the housing, the release cam comprising a stem portion and an arm portion opposite the stem portion, the stem portion being proximate to the housing, the arm portion being opposite the stem portion and away from the housing, the arm portion extending away from the stem portion of the release cam, the arm portion including a tapered portion that assists release of a release line when the release cam transitions from a closed state to an open state, the stem portion being rotatably coupled to a motor, the turning comprising turning, by the motor, the arm portion of the release cam from a closed state to an open state, when the release cam rotates to the closed state, an overhang of the arm portion of the release cam at least partially defining a cavity that is enclosed and capable of retaining the release line, wherein the cavity extends from an outer surface of the housing to an inner surface of the overhang of the arm portion, when the release cam rotates to the open state, the cavity is no longer enclosed to enable release of the release line, the motor being within the housing, the housing sealing the processor and the motor from getting wet when the housing is submerged.

11. The method of claim 10, wherein the line restraint system further comprises a release line retainer affixed outside of the housing, a portion of the release line retainer extending from the housing, and wherein in the closed state, the arm portion of the release cam being directed towards the release line retainer, the release line retainer and the overhang of the arm portion of the release cam at least partially defining the cavity that is enclosed.

12. The method of claim 10, wherein the line restraint system is capable of being coupled to an aquatic trap and capable of holding the release line in the cavity when the line restraint system is in the closed state, thereby enabling a trap line coupled to a buoy to be restrained from rising when the aquatic trap is deployed underwater.

13. The method of claim 10, wherein triggering, by the processor, the activation signal based on the acoustic signal comprises triggering the activation signal if the acoustic signal is of a particular frequency.

14. The method of claim 10, wherein triggering, by the processor, the activation signal based on the acoustic signal comprises triggering the activation signal if the acoustic signal has one or more particular properties.

15. The method of claim 10, wherein turning, in response to the activation signal, the release cam, comprises converting vibrations by at least one piezo receiver to a voltage for turning the release cam.

16. The method of claim 10, further comprising providing, by a transducer, an indication signal, the indication signal being directed to outside of the housing.

17. The method of claim 16, wherein the indication signal is provided upon receiving the acoustic signal.

18. The method of claim 17, wherein the indication signal includes an identifier that identifies the line restraint system, the indication signal being acoustic.

19. The method of claim 10, wherein the line restraint system is capable of being coupled to at least one bar within an inside of an aquatic trap, the aquatic trap comprising the at least one bar within its structure.

* * * * *